(12) United States Patent
Lim et al.

(10) Patent No.: US 11,711,196 B2
(45) Date of Patent: *Jul. 25, 2023

(54) METHOD FOR TRANSMITTING AND RECEIVING SIGNAL BY TERMINAL SUPPORTING DUAL-CONNECTIVITY BETWEEN E-UTRA AND NR AND TERMINAL PERFORMING THE METHOD

(71) Applicant: LG Electronics Inc., Seoul (KR)

(72) Inventors: Suhwan Lim, Seoul (KR); Yoonoh Yang, Seoul (KR); Sangwook Lee, Seoul (KR); Jaehyuk Jang, Seoul (KR); Joohee Lee, Seoul (KR); Manyoung Jung, Seoul (KR); Jinyup Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,390

(22) Filed: Apr. 8, 2022

(65) Prior Publication Data
US 2022/0231821 A1    Jul. 21, 2022

Related U.S. Application Data

(63) Continuation of application No. 16/320,181, filed as application No. PCT/KR2018/010063 on Aug. 30, 2018, now Pat. No. 11,387,968.
(Continued)

(30) Foreign Application Priority Data

May 14, 2018    (KR) .................. 10-2018-0054665

(51) Int. Cl.
*H04L 5/00* (2006.01)
*H04B 17/336* (2015.01)
(Continued)

(52) U.S. Cl.
CPC ......... *H04L 5/0092* (2013.01); *H04B 17/336* (2015.01); *H04W 24/10* (2013.01); *H04W 76/15* (2018.02)

(58) Field of Classification Search
None
See application file for complete search history.

(56) References Cited

U.S. PATENT DOCUMENTS

| 2015/0092634 A1 | 4/2015 | Yin et al. |
| 2016/0157293 A1 | 6/2016 | Pazhyannur et al. |
| (Continued) | | |

FOREIGN PATENT DOCUMENTS

| CN | 101047432 | 10/2007 |
| CN | 105518998 | 4/2016 |
| (Continued) | | |

OTHER PUBLICATIONS

China Telecom, "TP for TR 37.863-01-01: co-existence studies and MDS for DC_3A-n78A_BCS0," R4-1708980, 3GPP TSG-RAN WG4 Meeting #84, Berlin, Germany, Aug. 21-25, 2017, 7 pages.
(Continued)

*Primary Examiner* — Scott M Sciacca
(74) *Attorney, Agent, or Firm* — Fish & Richardson P.C.

(57) ABSTRACT

Provided is a method for transmitting and receiving a signal by a terminal supporting dual-connectivity between evolved universal terrestrial radio access (E-UTRA) and new radio (NR). In the method, when the terminal is configured to aggregate at least two carriers and when the at least two carriers include one of E-UTRA operating bands 1, 3, 19, and 21 and at least one of NR operating bands n78 and n79, an uplink center frequency of a first carrier among the at least two carriers is a first value and a downlink center frequency of the first carrier is a second value, a predetermined maximum sensitivity degradation (MSD) is applied to a reference sensitivity used for reception of the downlink signal.

10 Claims, 12 Drawing Sheets

Related U.S. Application Data

(60) Provisional application No. 62/630,267, filed on Feb. 14, 2018, provisional application No. 62/566,345, filed on Sep. 30, 2017, provisional application No. 62/557,014, filed on Sep. 11, 2017.

(51) Int. Cl.
*H04W 76/15* (2018.01)
*H04W 24/10* (2009.01)

(56) References Cited

U.S. PATENT DOCUMENTS

| | | | | |
|---|---|---|---|---|
| 2016/0198452 | A1* | 7/2016 | Takahashi | H04W 28/18 370/329 |
| 2018/0220295 | A1* | 8/2018 | Takahashi | H04W 72/0406 |
| 2018/0376383 | A1* | 12/2018 | Belghoul | H04W 76/16 |
| 2020/0119889 | A1 | 4/2020 | Jiang et al. | |

FOREIGN PATENT DOCUMENTS

| | | |
|---|---|---|
| EP | 3512285 | 7/2019 |
| JP | 2010258831 | 11/2010 |
| WO | WO2019216577 | 11/2019 |

OTHER PUBLICATIONS

China Telecom, "TP for TR 37.863-01-01: co-existence studies and MSD for DC_1A-n78A_BCS0," R4-1708983, 3GPP TSG-RAN WG4 Meeting #84, Berlin, Germany, Aug. 21-25, 2017, 7 pages.

CN Office Action in Chinese Appln. No. 201880016517.6, dated Mar. 23, 2021, 12 pages (with English translation).

Extended European Search Report in European Application No. 18826907.0, dated Dec. 18, 2019, 9 pages.

Japanese Office Action in Japanese Application No. 2019-509463, dated Jun. 9, 2020, 5 pages (with English translation).

LG Electronics, KDDI, "MSD analysis results for LTE(3DL/1 UL) + NR(1DL/1UL) DC UE," R4-1801598, 3GPP TSG RAN WG4 #86 Meeting, Athens, Greece, dated Feb. 26-Mar. 2, 2018, 8 pages.

Nokia, Nokia Shanghai Bell, "Single Tx UE in LTE-NR UL Dual Connectivity," RP-171878, 3GPP TSG RAN Meeting #77, Sapporo, Japan, Sep. 11-14, 2017, 5 pages.

NTT Docomo, Inc., "TP for TR 37.863-01-01 DC_19A-n78A," R4-1708977, 3GPP TSG-RAN Working Group 4 (Radio) meeting #84, Berlin, Germany, Aug. 21-25, 2017, 6 pages.

NTT Docomo, Inc., "TP for TR 37.863-01-01: 2DL/2UL DC_3A-n79A_BCS0," R4-1708895, 3GPP TSG-RAN Working Group 4 (Radio) meeting #84, Berlin, Germany, Aug. 21-25, 2017, 6 pages.

NTT Docomo, Inc., "MSD for combinations including 3.5 GHz, 4.5 GHz and 28 GHz," R4-1707511, 3GPP TSG-RAN WG4 Meeting #84, Berlin, Germany, dated Aug. 21-25, 2017, 5 pages.

NTT Docomo, Inc., "TP for TR 37.863-01-01: 2DL/2UL DC_19A-n79A_BCS0," R4-1707556, 3GPP TSG-RAN Working Group 4 (Radio) meeting #84 Berlin, Germany, dated Aug. 21-25, 2017, 4 pages.

NTT Docomo, Inc., "UE RF requirements for 3.3-3.8 GHz and 3.3-4.2 GHz," R4-1707507, 3GPP TSG-RAN WG4 Meeting #84, Berlin, Germany, dated Aug. 21-25, 2017, 6 pages.

Yuehua, "Research and Design of Wideband RF Front-End of TD-LTE Base Station Receiver," A Master Dissertation Submitted to University of Electronic Science and Technology of China, 2015, 100 pages (with English translation).

\* cited by examiner

METHOD FOR TRANSMITTING AND RECEIVING SIGNAL BY TERMINAL SUPPORTING DUAL-CONNECTIVITY BETWEEN E-UTRA AND NR AND TERMINAL PERFORMING THE METHOD

CROSS-REFERENCE TO RELATED APPLICATIONS

This application is a continuation of U.S. application Ser. No. 16/320,181, filed on Jan. 24, 2019, which is a National Stage filing under 35 U.S.C. 371 of International Application No. PCT/KR2018/010063, filed on Aug. 30, 2018, which claims the benefit of U.S. Provisional Applications No. 62/557,014 filed on Sep. 11, 2017, No. 62/566,345 filed on Sep. 30, 2017, No. 62/630,267 filed on Feb. 14, 2018, and Korean Patent Application No. 10-2018-0054665 filed on May 14, 2018, the contents of which are all hereby incorporated by reference herein in their entirety.

BACKGROUND OF THE INVENTION

Field of the Invention

The present invention relates to mobile communication

Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly The $5^{th}$-generation mobile telecommunications defined by the International Telecommunication Union (ITU) refers to providing a data transfer rate of up to 20 Gbps and a perceptible transfer rate of at least 100 Mbps anywhere. The $5^{th}$-generation mobile telecommunications, whose official name is 'IMT-2020', is aimed to be commercialized worldwide in 2020.

ITU proposes three usage scenarios, for example, enhanced mobile broadband (eMBB), massive machine type communication (mMTC), and ultra-reliable and low latency communications (URLLC).

First, URLLC relates to a usage scenario which requires high reliability and low latency. For example, services such as autonomous driving, factory automation, augmented reality require high reliability and low latency (e.g., a delay time of 1 ms or less). Currently, latency of 4G (LTE) is statistically 21 to 43 ms (best 10%) and 33 to 75 ms (median). This is not enough to support a service requiring latency of 1 ms or less.

Next, the eMBB usage scenario refers to a usage scenario requiring mobile ultra-wideband. This ultra-wideband high-speed service is unlikely to be accommodated by core networks designed for existing LTE/LTE-A. Thus, in the so-called 5th-generation mobile communication, core networks are urgently required to be re-designed.

Meanwhile, in the 5th generation mobile communication, a scheme (EN-DC) of dually connecting LTE and NR is underway to ensure communication stability. However, in a state in which a downlink carrier using LTE and a downlink carrier using NR are aggregated, transmission of an uplink signal may cause a harmonic component and an intermodulation distortion (IMD) component to impact on a downlink band of a terminal itself.

SUMMARY OF THE INVENTION

In an aspect, provided is a method for transmitting and receiving a signal by a terminal supporting dual-connectivity between evolved universal terrestrial radio access (E-UTRA) and new radio (NR). The method may comprise transmitting, when the terminal is configured to aggregate at least two carriers, an uplink signal using uplink of the at least two carriers; and receiving a downlink signal using downlink of the at least two carriers, wherein when the at least two carriers include one of E-UTRA operating bands 1, 3, 19, and 21 and at least one of NR operating bands n78 and n79, an uplink center frequency of a first carrier among the at least two carriers is a first value and a downlink center frequency of the first carrier is a second value, a predetermined maximum sensitivity degradation (MSD) is applied to a reference sensitivity used for reception of the downlink signal.

When the at least two carriers are the E-UTRA operating band 21 and the NR operating band n79, the first carrier corresponds to the E-UTRA operating band 21, the first value corresponds to 1457.5 MHz, and the second value corresponds to 1505.5 MHz, the MSD value is 18.4 dB.

When the at least two carriers are the E-UTRA operating band 1 and the NR operating bands n78 and n79, the first carrier corresponds to the NR operating band n79, the first value corresponds to 4870 MHz, and the second value corresponds to 4870 MHz, the MSD value is 15.9 dB.

When the at least two carriers are the E-UTRA operating band 1 and the NR operating bands n78 and n79, the first carrier corresponds to the NR operating band n78, the first value corresponds to 3490 MHz, and the second value corresponds to 3490 MHz, the MSD value is 4.6 dB.

When the at least two carriers are the E-UTRA operating band 3 and the NR operating bands n78 and n79, the first carrier corresponds to the NR operating band n79, the first value corresponds to 4910 MHz, and the second value corresponds to 4910 MHz, the MSD value is 16.3 dB.

When the at least two carriers are the E-UTRA operating band 3 and the NR operating bands n78 and n79, the first carrier corresponds to the NR operating band n78, the first value corresponds to 3710 MHz, and the second value corresponds to 3710 MHz, the MSD value is 4.2 dB.

When the at least two carriers are the E-UTRA operating band 19 and the NR operating bands n78 and n79, the first carrier corresponds to the NR operating band n79, the first value corresponds to 4515 MHz, and the second value corresponds to 4515 MHz, the MSD value is 29.3 dB.

When the at least two carriers are the E-UTRA operating band 19 and the NR operating bands n78 and n79, the first carrier corresponds to the NR operating band n78, the first value corresponds to 3715 MHz, and the second value corresponds to 3715 MHz, the MSD value is 28.8 dB.

When the at least two carriers are the E-UTRA operating band 21 and the NR operating bands n78 and n79, the first carrier corresponds to the NR operating band n79, the first value corresponds to 4873 MHz, and the second value corresponds to 4873 MHz, the MSD value is 30.1 dB.

When the at least two carriers are the E-UTRA operating band 19 and the NR operating bands n78 and n79, the first carrier corresponds to the NR operating band n78, the first value corresponds to 3487 MHz, and the second value corresponds to 3487 MHz, the MSD value is 29.8 dB.

In another aspect, provided is also a terminal supporting dual-connectivity between evolved universal terrestrial radio access (E-UTRA) and new radio (NR). The terminal may comprises a transceiver transmitting an uplink signal and receiving a downlink signal; and a processor controlling the transceiver, wherein when the terminal is configured to aggregate at least two carriers, the processor transmits the uplink signal using uplink of the at least two carriers; and receives the downlink signal using downlink of the at least two carriers, and when the at least two carriers include one of E-UTRA operating bands 1, 3, 19, and 21 and at least one of NR operating bands n78 and n79, an uplink center frequency of a first carrier among the at least two carriers is a first value and a downlink center frequency of the first carrier is a second value, a predetermined maximum sensitivity degradation (MSD) is applied to a reference sensitivity used for reception of the downlink signal.

According to a disclosure of the present invention, the above problem of the related art is solved.

DESCRIPTION OF EXEMPLARY EMBODIMENTS

Figure 1:
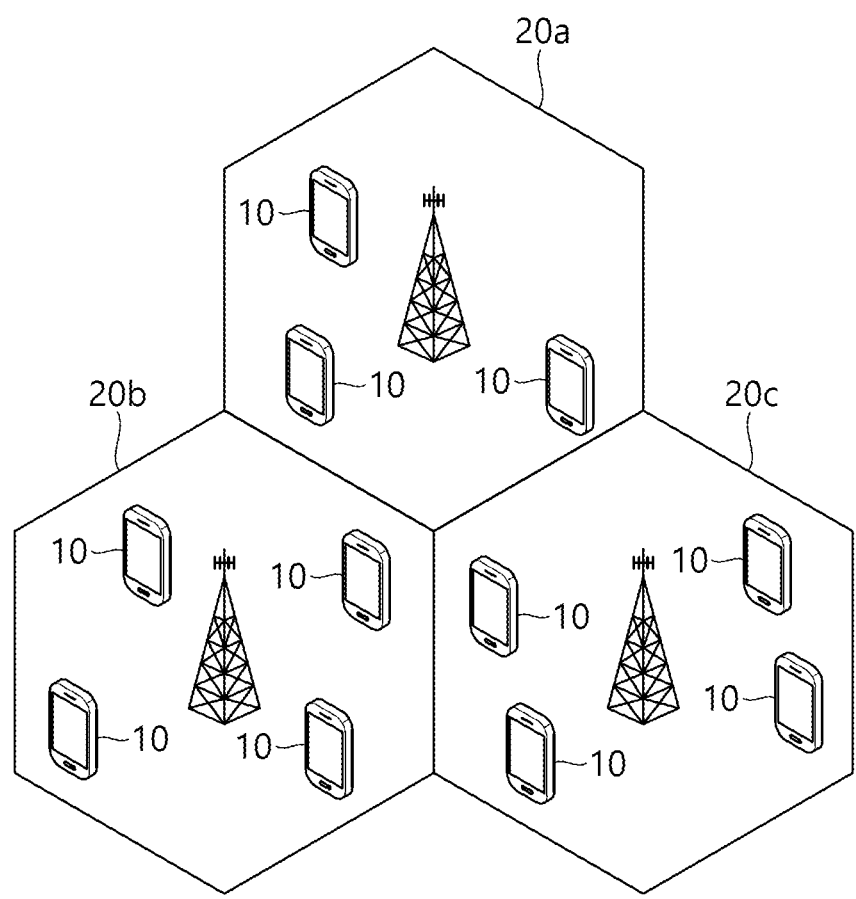
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is illustrated in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
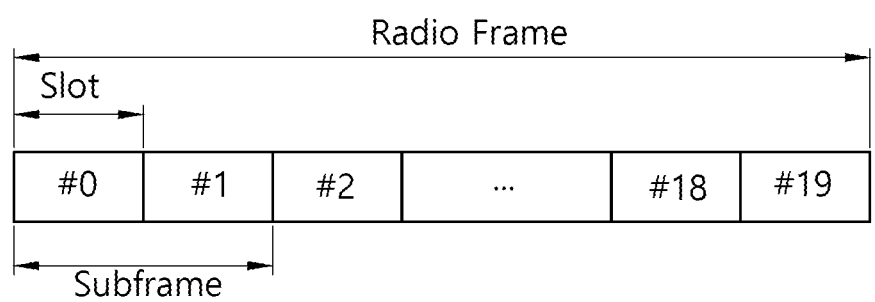
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
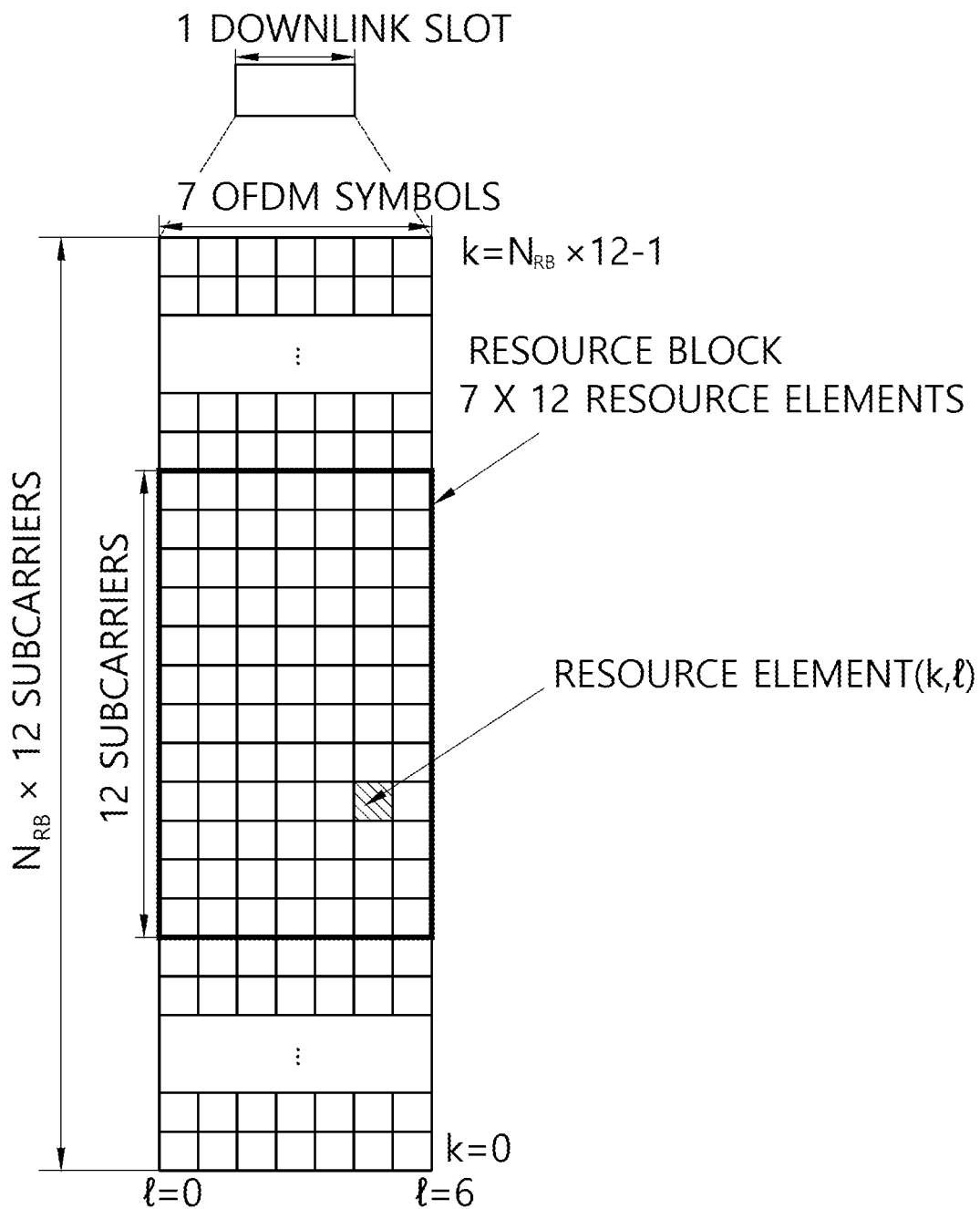
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
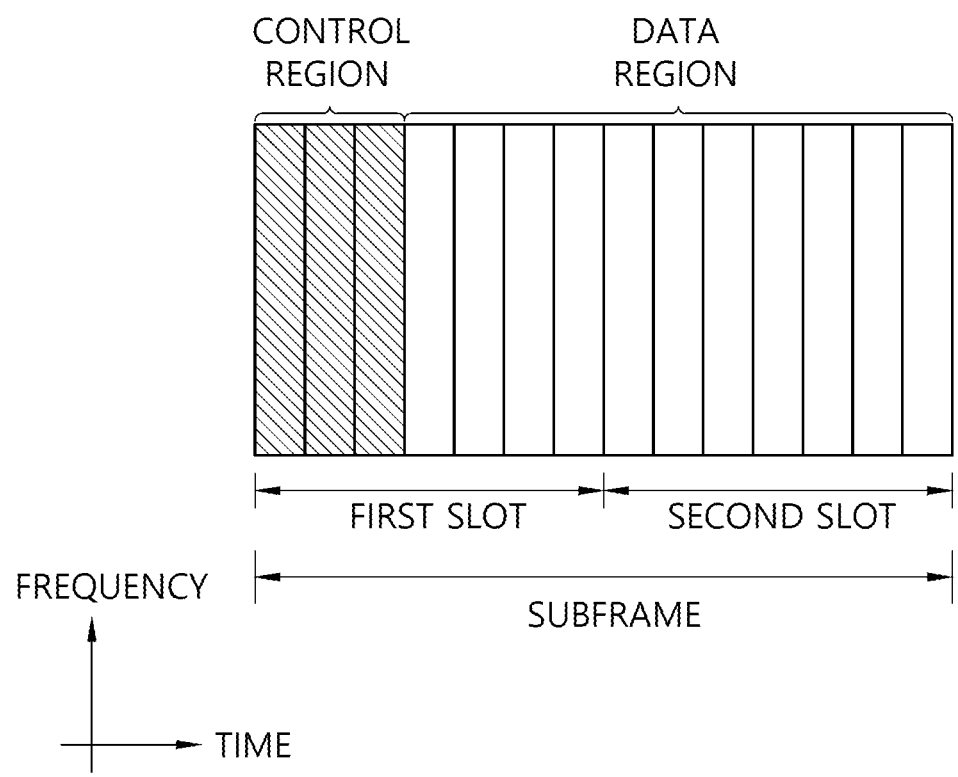
FIG. 4 illustrates the architecture of a downlink subframe.

In 3GPP LTE, the resource grid for one uplink slot illustrated in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
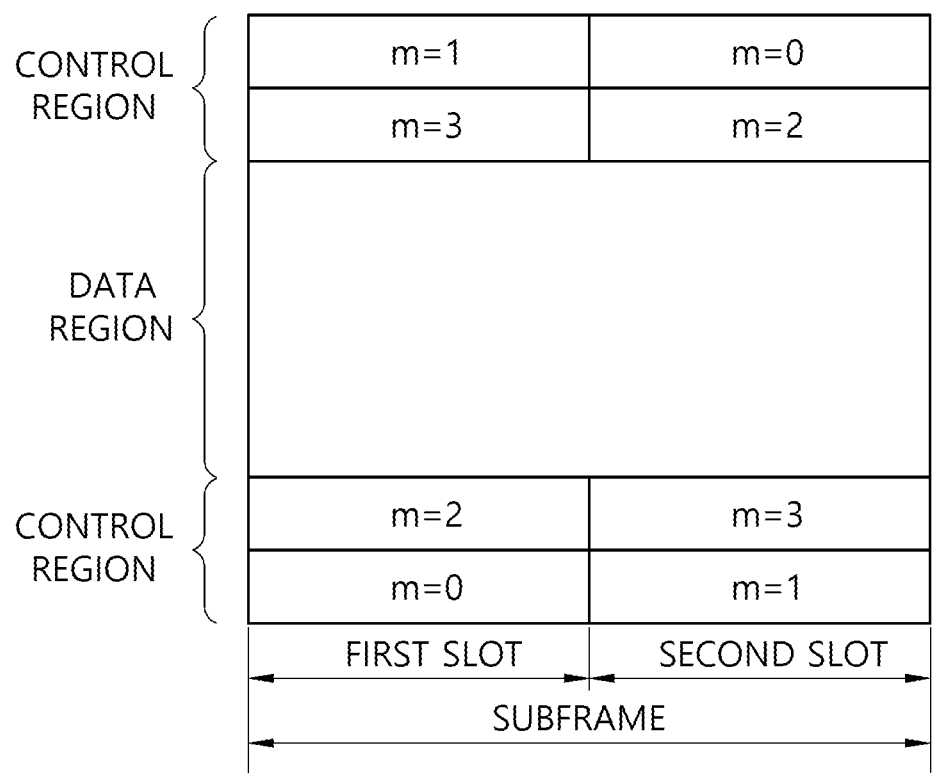
FIG. 5 illustrates the architecture of an uplink subframe in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Carrier Aggregation: CA

Hereinafter, a carrier aggregation system will be described.

The carrier aggregation (CA) system means aggregating multiple component carriers (CCs). By the carrier aggregation, the existing meaning of the cell is changed.

According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 6A:
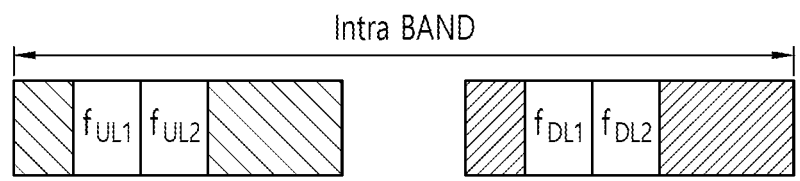
FIGS. 6A and 6B are conceptual views illustrating intra-band carrier aggregation (CA).
Figure 6B:
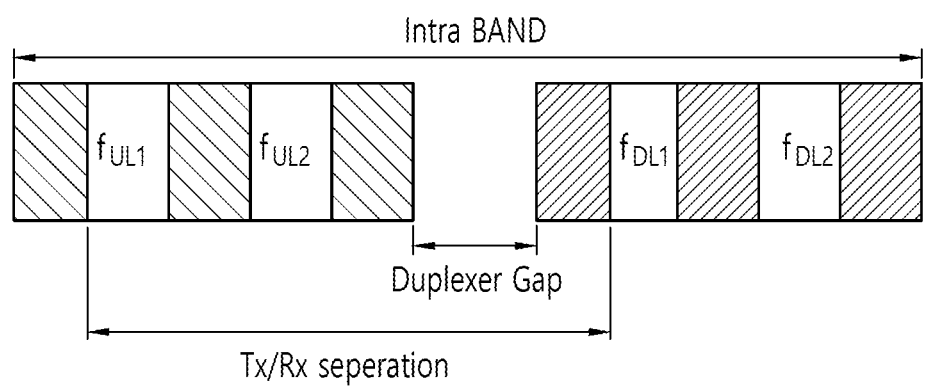

FIGS. 6A and 6B are concept views illustrating intra-band carrier aggregation (CA).

FIG. 6A illustrates intra-band contiguous CA, and FIG. 6B illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA illustrated in FIG. 6A and the intra-band non-contiguous CA illustrated in FIG. 6B.

Figure 7A:
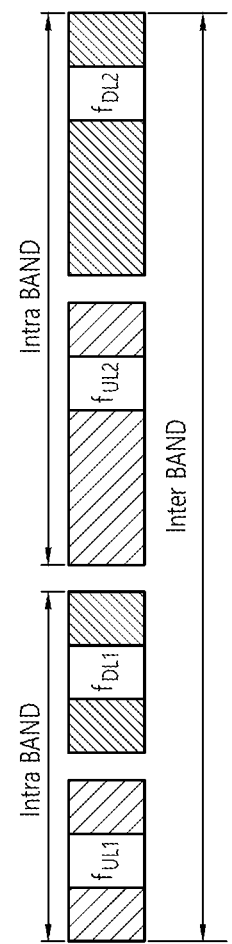
FIGS. 7A and 7B are conceptual views illustrating inter-band carrier aggregation (CA).
Figure 7B:
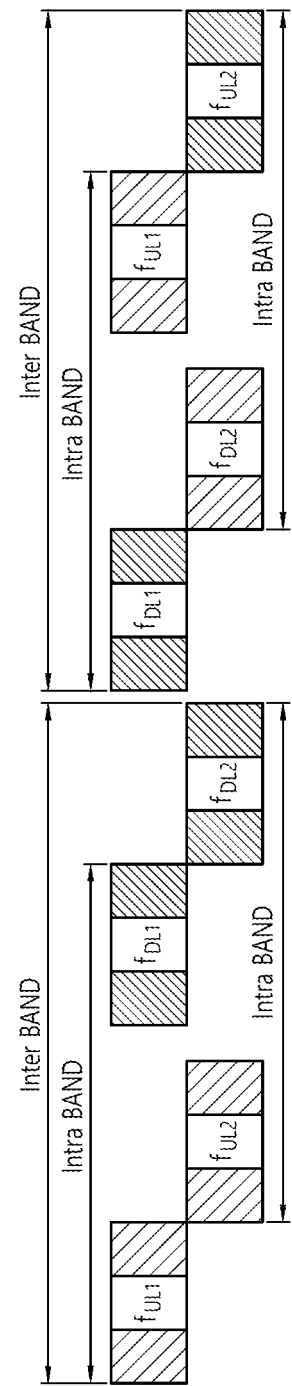

FIGS. 7A and 7B are concept views illustrating inter-band carrier aggregation.

FIG. 7A illustrates a combination of a lower band and a higher band for inter-band CA, and FIG. 7B illustrates a combination of similar frequency bands for inter-band CA.

In other words, the inter-band carrier aggregation may be separated into inter-band CA between carriers of a low band and a high band having different RF characteristics of inter-band CA as illustrated in FIG. 7A and inter-band CA of similar frequencies that may use a common RF terminal per component carrier due to similar RF (radio frequency) characteristics as illustrated in FIG. 7B.

TABLE 1

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

TABLE 2

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz -1517 MHz | TDD |
| n51 | 1427 MHz-1432 MHz | 1427 MHz -1432 MHz | TDD |
| n66 | 1710 MHz-1780 MHz | 2110 MHz -2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |

TABLE 2-continued

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

When operating bands are fixed as illustrated in Table 1 and Table 2, a frequency allocation organization of each country may assign a specific frequency to a service provider according to a situation of each country.

Meanwhile, in the current 5G NR technology, a scheme (EN-DC) of dually connecting LTE and NR is underway to ensure communication stability. However, in a state in which a downlink carrier using LTE and a downlink carrier using NR are aggregated, transmission of an uplink signal may cause a harmonic component and an intermodulation distortion (IMD) component to impact on a downlink band of the UE itself.

Specifically, the UE must be set to satisfy a reference sensitivity power level (REFSENS), which is minimum average power for each antenna port of the UE. However, in a case that the harmonic component and/or the IMD component occurs, the REFSENS for the downlink signal may not be satisfied. That is, the REFSENS must be set such that throughput thereof is at least 95% of maximum throughput of a reference measurement channel, but the occurrence of the harmonic component and/or the IMD component may cause the throughput to fall below 95%.

Thus, it is determined whether the harmonic component and/or the IMD component of the EN-DC terminal (or EN-DC user equipment (UE)) has occurred, and when the harmonic component and the IMD component of the EN-DC terminal has occurred, a maximum sensitivity degradation (MSD) value for a corresponding frequency band may be defined to allow relaxation for the REFSENS in a reception band of the EN-DC terminal based on a transmission signal of the EN-DC terminal. Here, the MSD is maximum allowable degradation of REFSENS, and in a certain frequency band, the REFSENS may be relaxed by the defined amount of MSD.

Accordingly, in the present disclosure, an MSD value for eliminating (or reducing) the harmonic component and IMD is proposed for a terminal set to aggregate two or more downlink carriers and two uplink carriers.

Disclosure of Present Specification

Hereinafter, in case that the UE transmits an uplink signal through two uplink carriers in an aggregation state of a plurality of downlink carriers and two uplink carriers, whether an interference is leaked to a downlink band of the UE is analyzed and a solution thereto is subsequently proposed.

Figure 8:
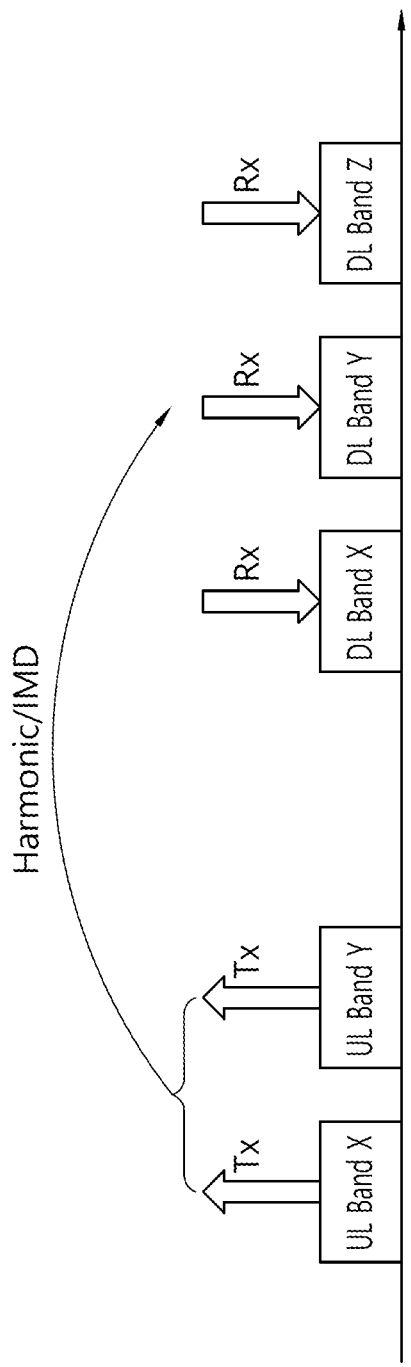
FIG. 8 illustrates a situation where a harmonic component and intermodulation distortion (IMD) are introduced into downlink band when uplink signal is transmitted through two uplink carriers.

FIG. 8 illustrates a situation where an uplink signal transmitted through an uplink band flows into an uplink band of the UE.

Referring to FIG. 8, in a state in which three downlink bands are set by carrier aggregation and two uplink bands are set, when the UE transmits an uplink signal through two uplink bands, the harmonic component and the IMD component may be introduced into a downlink band of the UE. In this situation, an MSD value capable of correcting the REFSENS is proposed to prevent reception sensitivity of a downlink signal from deteriorating due to the harmonic component and/or the IMD component. In addition, although the UE appropriately solves the problem, a degradation of a reception sensitivity level in the downlink band of the UE may not be completely prevented due to cross isolation and coupling loss due to the PCB, a scheme of alleviating the requirements that an existing UE must meet.

I. First Disclosure

Figure 9:
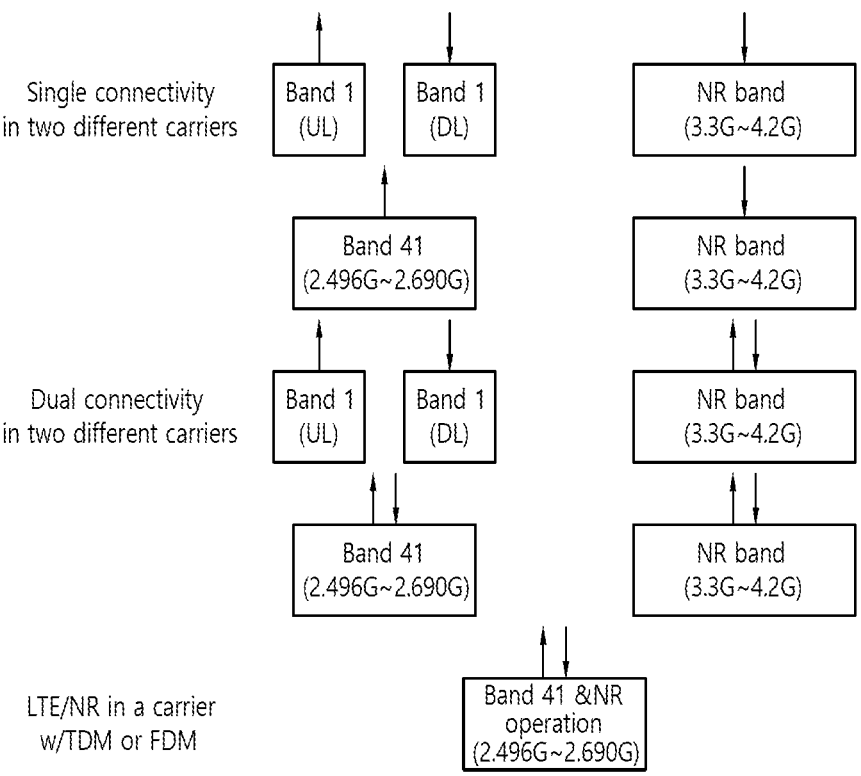
FIG. 9 shows a scenario in which a 5G NR band and an LTE E-UTRA band of 6 GHz or lower may coexist in a 5G NR non-standalone UE.

FIG. 9 shows a scenario in which a 5G NR band and an LTE E-UTRA band of 6 GHz or lower may coexist in a 5G NR non-standalone UE.

Referring to FIG. 9, a shared antenna RF architecture in which the NR NSA UE supports dual connection between an NR band of 6 GHz or lower and an LTE E-UTRA band may be considered. Table 3 shows E-UTRA bands which may be aggregated with NR bands in the NR NSA UE.

TABLE 3

| | | LTE band | | | | | | | | | | | | | | |
|---|---|---|---|---|---|---|---|---|---|---|---|---|---|---|---|---|
| | | 1 | 2 | 3 | 5 | 7 | 8 | 19 | 20 | 21 | 25 | 26 | 28 | 39 | 41 | 66 |
| NR Freq. Range | 3.3-4.2 GHz | Y | | Y | Y | Y | Y | Y | Y | | | Y | Y | Y | Y | |
| | 4.4-4.99 GHz | Y | | Y | Y | | Y | Y | | Y | | Y | Y | Y | Y | |
| | 24.25-29.5 GHz | Y | | Y | Y | Y | Y | Y | Y | | | Y | Y | Y | Y | Y |
| | 31.8-33.4 GHz | | | | Y | | Y | | | Y | | | Y | | | |
| | 37-40 GHZ | | | | | | | | | | | | | | | Y |
| | Band 7 | | | | Y | | Y | | Y | | | | | | | |
| | Band 28 | | | | Y | Y | | | Y | | | | | | | |
| | Band 41 | Y | Y | Y | Y | | | | | | Y | Y | | | Y | |

Referring to FIG. 9 and Table 3, LTE E-UTRA operating bands 1 and 41 may be aggregated with an NR operating band n77 (3.3 GHz-4.2 GHz).

As illustrated in FIG. 9, a scenario in which LTE E-UTRA operating bands 1 and 41 coexist with an NR operating band n77 may include a case 1) where an LTE frequency band and an NR frequency band are single-connected (single connectivity), a case 2) where the LTE frequency band and the NR frequency band are dual-connected (dual connectivity), and a case 3) where the LTE frequency band and the NR frequency band are dual-connected in the same frequency band 1) Case where LTE frequency band and NR frequency band are single-connected When LTE and NR are single-connected, LTE may operate as a primary cell. Here, as illustrated in FIG. 9, the LTE operating frequency band B1 may transmit a signal and an Rx of the LTE operating frequency band B1 operates as frequency division duplex (FDD), and thus, signal transmission and reception may be simultaneously performed. NR operates as a secondary cell, and in the NR operating frequency band n77, a signal may be received simultaneously with transmission and reception in the LTE operating frequency band B1.

2) Case where LTE frequency band and the NR frequency band are dual-connected (EN-DC)

When the LTE frequency band and the NR frequency band are dual-connected, impact on a reception band of the UE may be different depending on whether the LTE frequency band operates as FDD or time division duplexing (TDD).

For example, when the LTE operating frequency band B1 and the NR operating frequency band n77 are dual-connected, data reception may be performed only in the LTE operating frequency band B1. Since the NR operating frequency band n77 operates as TDD, no signal reception occurs. Therefore, in this case, the harmonic/IMD impact may be analyzed only for a reception band of the LTE operating frequency band B1 in which signal reception may occur.

Meanwhile, unlike the case of FIG. 9, when the LTE operating frequency band B1 and the NR operating frequency band n7 are dual-connected, since both the LTE operating frequency band B1 and the NR operating frequency band n7 operate as FDD, harmonic/IMD impact must be analyzed in both the LTE operating frequency band B1 and the NR operating frequency band n7.

Also, when the LTE operating frequency band B41 and the NR operating frequency band n77 are dual-connected, both the LTE operating frequency band B41 and the NR operating frequency band n77 operate as TDD, and thus, signals are not simultaneously transmitted and received at the same ban so there is no need to analyze the harmonic/IMD impact. However, when both bands operate asynchronously, self-interference may need to be analyzed.

3) Case where LTE frequency band and NR frequency band are dual-connected at the same frequency band For example, the LTE operating frequency band B41 and the NR operating frequency band n41 may be dual-connected or the LTE operating frequency band B71 and the NR operating frequency band n71 may be dual-connected. In this case, MPR/A-MPR must be analyzed according to RF architecture.

As illustrated in FIG. 9, when the LTE operating frequency band B41 and the NR operating frequency band n41 are dual-connected, the frequency bands B41 and n41 operate as TDD, and thus, the harmonic/IMD problem for the reception band of the UE does not arise.

However, if the LTE operating frequency band B71 and the NR operating frequency band n71 are dual-connected, since the frequency bands B71 and n71 operate as FDD, intra-band contiguous CA occurs in the band, and thus, the harmonic/IMD problem of the reception band of the UE regarding the frequency bands B71 and n71 must be analyzed.

Also, Table 4 shows the harmonic and IMD problem when the NR NSA terminal supports single/dual-connection between the NR operating band n77 and the LTE E-UTRA operating bands, and Table 5 shows the harmonic and IMD problem when the NR NSA terminal supports single/dual-connection between the NR operating band n79 and the LTE E-UTRA operating bands. Referring to Table 4 and Table 5, it can be seen that the harmonic problem is a major factor in the reduction of sensitivity. In addition, in the case of dual connectivity (DC), the reception frequency band of the UE may be impacted by the IMD. Therefore, a maximum sensitivity degradation (MSD) must be considered not only for the harmonic problem but also for the IMD problem, and a scheme of guaranteeing a zero MSD in the existing E-UTRA band by optimizing resource block (RB) assignment in the NR band or by controlling the RB size or position by gNB scheduling must be considered.

TABLE 4

| E-UTRA band | | | NR band (MHz) 3300-4200 | |
|---|---|---|---|---|
| E-UTRA band | UL range (MHz) | Harmonic order | Harmonic range (MHz) | Harmonic/IMD problem |
| B1 | 1920-1980 | 2x | 3840-3960 | 1) Harmonics into NR<br>2) $2^{nd}$, $4^{th}$ & $5^{th}$ IMD into B1<br>3) $4^{th}$ & $5^{th}$ IMD into NR |
| B3 | 1710-1785 | 2x | 3420-3570 | 1) Harmonics into NR<br>2) $2^{nd}$, $4^{th}$ & $5^{th}$ IMD into B3<br>3) $4^{th}$ & $5^{th}$ IMD into NR |
| B5 | 824-849 | 4x<br>5x | 3296-3396<br>4120-4245 | 1) Harmonics into NR<br>2) $4^{th}$ & $5^{th}$ IMD into B5<br>3) $2^{nd}$ & $5^{th}$ IMD into NR |
| B7 | 2500-2570 | — | N/A | 1) No harmonics<br>2) $4^{th}$ IMD into B7<br>3) $3^{rd}$ & $4^{th}$ IMD into NR |
| B8 | 880-915 | 4x | 3520-3660 | 1) Harmonics into NR<br>2) $4^{th}$ IMD into B8<br>3) $2^{nd}$ & $5^{th}$ IMD into NR |
| B19 | 830-845 | 4x<br>5x | 3320-3380<br>4150-4225 | 1) Harmonics into NR<br>2) B19에 $4^{th}$ & $5^{th}$ IMD<br>3) NR에 $2^{nd}$ & $5^{th}$ IMD |
| B20 | 832-862 | 4x<br>5x | 3328-3448<br>4160-4310 | 1) Harmonics into NR<br>2) $4^{th}$ & $5^{th}$ IMD into B19<br>3) $2^{nd}$ & $5^{th}$ IMD into NR |

TABLE 4-continued

| E-UTRA band | | | NR band (MHz) 3300-4200 | |
| --- | --- | --- | --- | --- |
| E-UTRA band | UL range (MHz) | Harmonic order | Harmonic range (MHz) | Harmonic/IMD problem |
| B21 | 1447.9-1462.9 | — | N/A | 1) No harmonics<br>2) No impact of IMD on B21<br>3) $4^{th}$ & $5^{th}$ IMD into NR |
| B25 | 1850-1915 | 2x | 3700-3830 | 1) Harmonics into NR<br>2) $2^{nd}$, $4^{th}$ & $5^{th}$ IMD into B25<br>3) $4^{th}$ & $5^{th}$ IMD into NR |
| B26 | 814-849 | 4x<br>5x | 3256-3396<br>4070-4245 | 1) Harmonics into NR<br>2) $4^{th}$ & $5^{th}$ IMD into B26<br>3) $2^{nd}$ & $5^{th}$ IMD into NR |
| B28 | 703-748 | 5x | 3515-3740 | 1) Harmonics into NR<br>2) $5^{th}$ IMD into B28<br>3) $2^{nd}$ IMD into NR |
| B38 | 2570-2620 | — | N/A | 1) No harmonics<br>2) $4^{th}$ IMD into B7<br>3) $3^{rd}$ & $4^{th}$ IMD into NR<br>TDD-TDD sync. → No impact |
| B39 | 1880-1920 | 2x | 3760-3840 | 1) Harmonics into NR<br>2) $2^{nd}$, $4^{th}$ & $5^{th}$ IMD into B39<br>3) $4^{th}$ & $5^{th}$ IMD into NR<br>TDD-TDD sync. → No impact |
| B41 | 2496-2690 | — | N/A | 1) No harmonics<br>2) $4^{th}$ IMD into B41<br>3) $3^{rd}$ & $4^{th}$ IMD into NR<br>TDD-TDD sync. → No impact |
| B42 | 3400-3600 | — | N/A | 1) No harmonics<br>2) $3^{rd}$, $5^{th}$ IMD into B42<br>3) $3^{rd}$, $5^{th}$ IMD into NR<br>TDD-TDD sync. → No impact |

TABLE 5

| E-UTRA band | | | NR band (MHz) 4400-5000 | |
| --- | --- | --- | --- | --- |
| E-UTRA band | UL range (MHz) | harmonic order | harmonic range (MHz) | harmonic/IMD problem |
| B1 | 1920-1980 | — | N/A | 1) No harmonics into NR<br>2) No impact on B1<br>3) Impact of $4^{th}$ IMD on NR |
| B3 | 1710-1785 | — | N/A | 1) No harmonics into NR<br>2) $5^{th}$ IMD into B3<br>3) $5^{th}$ IMD into NR |
| B8 | 880-915 | 5x | 4400-4575 | 1) Harmonic into NR<br>2) $5^{th}$ IMD into B8<br>3) No harmonics into NR |
| B19 | 830-845 | 6x | 4980-5070 | 1) Harmonics into NR<br>2) No IMD problem at B19<br>3) No IMD problem at NR |
| B21 | 1447.9-1462.9 | — | N/A | 1) No harmonics<br>2) $3^{rd}$ IMD into B21<br>3) $5^{th}$ IMD into NR |
| B26 | 814-849 | 6x | 4884-5094 | 1) Harmonic into NR<br>2) No IMD problem at B26<br>3) No IMD problem at NR |
| B28 | 703-748 | 6x<br>7x | 4218-4488<br>4921-5236 | 1) Harmonics into NR<br>2) No IMD problem at B28<br>3) No IMD problem at NR |

TABLE 5-continued

| | E-UTRA band | | NR band (MHz) 4400-5000 | |
|---|---|---|---|---|
| E-UTRA band | UL range (MHz) | harmonic order | harmonic range (MHz) | harmonic/IMD problem |
| B39 | 1880-1920 | — | N/A | 1) No harmonics into NR<br>2) No IMD problem at B39<br>3) $4^{th}$ IMD into NR → TDD-TDD sync. → No impact |
| B41 | 2496-2690 | 2x | 4992-5380 | 1) Harmonic into NR<br>2) $2^{nd}$, $4^{th}$ & $5^{th}$ IMD into B41<br>3) $4^{th}$ & $5^{th}$ IMD into NR<br>TDD-TDD sync. → No impact |
| B42 | 3400-3600 | — | N/A | 1) No harmonics into NR<br>2) No IMD problem at B42<br>3) No IMD problem NR |

According to Tables 4 and 5, it can be seen that the harmonic/IMD problem does not occur when considering the synchronized TDD-TDD network between the existing TDD LTE band and NR band.

Thus, the following phenomenon may be discovered on the basis of Table 4 and Table 5.

Observation 1: In a TDD-TDD synchronization network, the harmonic/IMD problems does not occur Observation 2: In an FDD-TDD NSA terminal, the harmonic problem may have a fatal impact on NR reception frequency of the terminal.

The harmonic problem may impact on the NR band regarding FDD-TDD DC NSA terminals. Thus, a harmonic trap filter must be considered for a specific NSA terminal. The harmonic trap filter may significantly reduce an interference level regarding the NR band. Also, an MSD level regarding the NR band of the NSA terminal may be defined regardless of harmonic order.

A third point is the IMD problem regarding a NSA DC terminal. This may be divided into two problems.

A first problem is that the IMD may impact on a reception LTE (E-UTRA) band of the terminal.

Observation 3: Regarding the FDD-TDD NSA terminal, the IMD may impact on an LTE reception frequency of the terminal Since mobility control of the NSA terminal is based on LTE connection, desensitization of the LTE band must be prevented through dual-transmission that guarantees an MSD level of 0 dB in the existing LTE band. Thus, additional maximum power reduction (A-MPR) requirements in the NR band must be defined to protect the existing LTE band or allow resource block (RB) shift or a limited RB size in the NR band.

Also, the second problem may impact on a reception NR band of the terminal.

Observation 4: In the FDD-TDD NSA terminal, the IMD may fall on the NR reception frequency of the terminal.

Here, if a required MSD level is not higher than a specific level, the MSD level for the NR band may be defined. Then, dual-connectivity (DC) for a combination of LTE band and NR band may be allowed. However, if the required MSD level is higher than the specific level, the NSA DC of the combination of the LTE band and the NR band may not be allowed In an LTE dual-uplink carrier aggregation (CA) band combination, an average MSD level regarding an IMD4 ($4^{th}$ IMD) generated from 11 sample band combinations of the Table 7.3.1A-0f of TS 36.101 in which MSD levels according to dual-uplink CA band combinations is 7.56 dB. Also, an average MSD level regarding IMD5 ($5^{th}$ IMD) is 4.68. dB. However, a statistical MSD level regarding IMD3 ($3^{rd}$ IMD) is 13.73 dB.

Observation 5: In the dual uplink LTE CA, an MSD level according to IMD4 and IMD5 may be approximately 10 dB or less.

Based on the MSD results of the 2DL/2UL CA band combination of TS 36.101, a reference MSD level may be determined as 10 dB. This may mean that if the MSD level is greater than 10 dB, NSA DC in the combination of the candidate LTE band and the NR band is not allowed. If not, an NSA DC operation in the combination of the LTE band and the NR NSA band is allowed and an MSD level may be defined as a REFSENS exceptional condition.

According to the above observations, in the present disclosure, a 5G NSA terminal of 6 GHz or lower is proposed as follows:

Proposal 1: For the harmonic problem, a harmonic trap filter may be considered to reduce an interference signal level and the MSD level may be defined.

Proposal 2: When the IMD falls on the existing LTE band, a 0 dB MSD must be guaranteed using the A-MPR scheme or next generation NodeB (gNB) scheduling in the NR band.

Proposal 3: When the IMD falls on the NR band, an MSD level may be defined as exceptional requirements for reference sensitivity (REFSENS).

Proposal 4: Based on observation 4 and observation 5 above, the MSD level may be determined to be 10 dB as a reference point regarding whether NSA dual-connection operation is allowed.

II. Second Disclosure

To support dual-connection between the NR band and the LTE E-UTRA band, it is necessary to evaluate a coexistence analysis for an NSA operation within some NR deployment scenarios. Thus, in the second disclosure, an MSD value for supporting a DC operation although self-interference impacts on a reception frequency band of the terminal is proposed.

Regarding NR, a shared antenna RF architecture for NSA terminals of 6 GHz or lower may be considered as an LTE system. Thus, a shared antenna RF architecture for a general NSA DC terminal may be considered to derive the MSD level. However, some DC band combinations for the NR DC terminal must consider a separate RF architecture which means that operating frequency ranges between the NR band and the LTE band overlap like DC_42A-n77A, DC_42A-n78A, and DC_41_n41A.

1. Harmonic Problem in NR Band

Based on a coexistence analysis result for the NSA DC terminal, the MSD level for the following five cases may be determined. When the MSD level is analyzed, a harmonic trap filter may be used.

$2^{nd}$ harmonic: DC_1A-n77A
$4^{th}$ harmonic: DC_5A-n78A, DC_8A-n78A, DC_20A-n78A
$5^{th}$ harmonic: DC_5A-n77A, DC_8A-n79A, DC_19A-n77A, DC_20A-n77A
$6^{th}$ harmonic: DC_19A-n79A, DC_28A-n79A
$7^{th}$ harmonic: DC_28A-n79A MSD Level Regarding $2^{nd}$ Harmonic Table 6 below shows RF component isolation parameters of the DC_1A-n77A terminal for deriving the MSD level at 6 GHz or lower.

The major factor for determining the MSD level for the second harmonic is an isolation level from the LTE band B1 power amplifier (PA) to the NR band n77 low-noise amplifier (LNA). It may be limited to 3.3 GHz to 4.2 GHz by the B1 PA attenuation level.

According to Table 6, the MSD level for DC_1A-n77A may be expressed as illustrated in Table 7 below.

TABLE 7

|  | Thermal | W/HTF | | W/O HTF | |
|---|---|---|---|---|---|
|  |  | H2 level (dBm) | MSD (dB) | H2 level (dBm) | MSD (dB) |
| Main Path | −101 | −67.0 | 34.8 | −62.4 | 39.4 |
| Diversity Path | −101 | −67.0 | 34.8 | −66.2 | 35.5 |
| After MRC |  |  | 31.8 |  | 34.0 |

MSD Level for $4^{th}$ Harmonic

Table 8 shows RF component isolation parameters of the DC_5A-n78A terminal for deriving the MSD level at 6 GHz or lower.

TABLE 6

| Parameter | Option1: W/HTF | | | | Option2: W/O HTF | | | |
|---|---|---|---|---|---|---|---|---|
|  | Primary | | Diversity | | Primary | | Diversity | |
|  | Value | H2 level | Value | H2 level | Value | H2 level | Value | H2 level |
| B1 Tx in PA output | 28 |  | 28 |  | 28 |  | 28 |  |
| B1 PA H2 attenuation | 35 | −7 | 35 | −7 | 35 | −7 | 35 | −7 |
| B1 duplexer H2 attenuation | 30 | −37 | 30 | −37 | 30 | −37 | 30 | −37 |
| Harmonic filter | 25 | −62 | 25 | −62 | 0 | −37 | 0 | −37 |
| Mid switch H2 | −65 | −60.2 | −65 | −60.2 | −65 | −37 | −65 | −37 |
| Diplexer attenuation | 25 | −85.2 | 25 | −85.2 | 25 | −62 | 25 | −62 |
| Antenna isolation | 0 | −85.2 | 10 | −95.2 | 0 | −62 | 10 | −72 |
| HB switch attenuation | 0.7 | −85.9 | 0.7 | −95.9 | 0.7 | −62.7 | 0.7 | −72.7 |
| HB switch H2 | −130 | −85.9 | −110 | −95.8 | −130 | −62.7 | −110 | −72.7 |
| n77 Rx filter atten. | 1.5 | −87.4 | 1.5 | −97.3 | 1.5 | −64.2 | 1.5 | −74.2 |
| n77 Rx filter H2 | −110 | −87.4 | −110 | −97.0 | −110 | −64.2 | −110 | −74.2 |
| B1 PA to NR B77 LNA isolation | 60 | −67.0 | 60 | −67.0 | 60 | −67.0 | 60 | −67.0 |
| Composite |  | −67.0 |  | −67.0 |  | −62.4 |  | −66.2 |

TABLE 8

|  | Option1: W/HTF | | | | Option2: W/O HTF | | | |
| --- | --- | --- | --- | --- | --- | --- | --- | --- |
|  | Primary | | Diversity | | Primary | | Diversity | |
| Parameter | Value | H4 level | Value | H4 level | Value | H4 level | Value | H4 level |
| B5 Tx in PA output | 28 |  | 28 |  | 28 |  | 28 |  |
| B5 PA H4 attenuation | 48 | −20 | 48 | −20 | 48 | −20 | 48 | −20 |
| B5 duplexer H4 attenuation | 30 | −50 | 30 | −50 | 30 | −50 | 30 | −50 |
| Harmonic filter | 25 | −75 | 25 | −75 | 0 | −50 | 0 | −50 |
| Low switch H4 | −65 | −64.6 | −65 | −64.6 | −65 | −49.9 | −65 | −49.9 |
| Diplexer attenuation | 27 | −91.6 | 27 | −91.6 | 27 | −76.9 | 27 | −76.9 |
| Antenna isolation | 0 | −91.6 | 10 | −101.6 | 0 | −76.9 | 10 | −86.9 |
| HB switch attenuation | 0.7 | −92.3 | 0.7 | −102.3 | 0.7 | −77.6 | 0.7 | −87.6 |
| HB switch H4 | −130 | −92.3 | −110 | −101.6 | −130 | −77.6 | −110 | −87.5 |
| n78 Rx filter atten. | 1.5 | −93.8 | 1.5 | −103.1 | 1.5 | −79.1 | 1.5 | −89.0 |
| n78 Rx filter H4 | −110 | −93.7 | −110 | −102.1 | −110 | −79.1 | −110 | −89.0 |
| B5 PA to NR B78 LNA isolation | 60 | −80.0 | 60 | −80.0 | 60 | −80.0 | 60 | −80.0 |
| Composite |  | −79.8 |  | −80.0 |  | −76.5 |  | −79.5 |

According to Table 8, the MSD level for DC_5A-n78A may be expressed as illustrated in Table 9 below.

TABLE 9

|  |  | W/HTF | | W/O HTF | |
| --- | --- | --- | --- | --- | --- |
|  | Thermal | H4 level (dBm) | MSD (dB) | H4 level (dBm) | MSD (dB) |
| Main Path | −101 | −79.8 | 22.0 | −76.5 | 25.3 |
| Diversity Path | −101 | −80.0 | 21.8 | −79.4 | 22.3 |
| After MRC |  |  | 18.9 |  | 20.6 |

MSD Level for 5$^{th}$ Harmonic

Table 10 shows RF component isolation parameters for the DC_19A-n77A terminal to derive the MSD level at 6 GHz or lower.

TABLE 10

|  | Option1: W/HTF | | | | Option2: W/O HTF | | | |
| --- | --- | --- | --- | --- | --- | --- | --- | --- |
|  | Primary | | Diversity | | Primary | | Diversity | |
| Parameter | Value | H5 level | Value | H5 level | Value | H5 level | Value | H5 level |
| B19 Tx in PA output | 28 |  | 28 |  | 28 |  | 28 |  |
| B19 PA H5 attenuation | 53 | −25 | 53 | −25 | 53 | −25 | 53 | −25 |
| B19 duplexer H5 attenuation | 30 | −55 | 30 | −55 | 30 | −55 | 30 | −55 |
| Harmonic filter | 25 | −80 | 25 | −80 | 0 | −55 | 0 | −55 |
| Low switch H5 | −65 | −64.9 | −65 | −64.9 | −65 | −54.6 | −65 | −54.6 |
| Diplexer attenuation | 27 | −91.9 | 27 | −91.9 | 27 | −81.6 | 27 | −81.6 |
| Antenna isolation | 0 | −91.9 | 10 | −101.9 | 0 | −81.6 | 10 | −91.6 |
| HB switch attenuation | 0.7 | −92.6 | 0.7 | −102.6 | 0.7 | −82.3 | 0.7 | −92.3 |
| HB switch H5 | −130 | −92.6 | −110 | −101.8 | −130 | −82.3 | −110 | −92.2 |
| n77 Rx filter atten. | 1.5 | −94.1 | 1.5 | −103.3 | 1.5 | −83.8 | 1.5 | −93.7 |
| n77 Rx filter H5 | −110 | −94.0 | −110 | −102.5 | −110 | −83.8 | −110 | −93.6 |
| B19 PA to NR B77 LNA isolation | 60 | −85.0 | 60 | −85.0 | 60 | −85.0 | 60 | −85.0 |
| Composite |  | −84.5 |  | −84.9 |  | −81.3 |  | −84.4 |

According to Table 10, the MSD level for DC_19A-n77A may be expressed as in Table 11 below.

TABLE 11

|  |  | W/HTF | | W/O HTF | |
| --- | --- | --- | --- | --- | --- |
|  | Thermal | H5 level (dBm) | MSD (dB) | H5 level (dBm) | MSD (dB) |
| Main Path | −101 | −84.5 | 17.4 | −81.3 | 20.5 |
| Diversity Path | −101 | −84.9 | 16.9 | −84.4 | 17.4 |
| After MRC |  |  | 14.1 |  | 15.7 |

MSD Level for 6$^{th}$ Harmonic

Table 12 shows RF component isolation parameters of the DC_19A-n79A terminal to derive the MSD level at 6 GHz or lower.

TABLE 12

| | Option1: W/HTF | | | | Option2: W/O HTF | | | |
| | Primary | | Diversity | | Primary | | Diversity | |
| Parameter | Value | H6 level | Value | H6 level | Value | H6 level | Value | H6 level |
|---|---|---|---|---|---|---|---|---|
| B19 Tx in PA output | 28 | | 28 | | 28 | | 28 | |
| B19 PA H6 attenuation | 60 | −32 | 60 | −32 | 60 | −32 | 60 | −32 |
| B19 duplexer H6 attenuation | 30 | −62 | 30 | −62 | 30 | −62 | 30 | −62 |
| Harmonic filter | 25 | −87 | 25 | −87 | 0 | −62 | 0 | −62 |
| Low switch H6 | −70 | −69.9 | −70 | −69.9 | −70 | −61.4 | −70 | −61.4 |
| Diplexer attenuation | 27 | −96.9 | 27 | −96.9 | 27 | −88.4 | 27 | −88.4 |
| Antenna isolation | 0 | −96.9 | 10 | −106.9 | 0 | −88.4 | 10 | −98.4 |
| HB switch attenuation | 0.7 | −97.6 | 0.7 | −107.6 | 0.7 | −89.1 | 0.7 | −99.1 |
| HB switch H6 | −130 | −97.6 | −110 | −105.6 | −130 | −89.1 | −110 | −98.7 |
| n79 Rx filter atten. | 1.5 | −99.1 | 1.5 | −107.1 | 1.5 | −90.6 | 1.5 | 100.2 |
| n79 Rx filter H6 | −110 | −98.8 | −110 | −105.3 | −110 | −90.5 | −110 | −99.8 |
| B19 PA to NR B79 LNA isolation | 60 | −92.0 | 60 | −92.0 | 60 | −92.0 | 60 | −92.0 |
| Composite | | −91.2 | | −91.8 | | −88.2 | | −91.3 |

According to Table 12, the MSD level for DC_19A-n79A may be expressed as illustrated in Table 13 below.

TABLE 13

| | Thermal | W/HTF | | W/O HTF | |
| | | H6 level (dBm) | MSD (dB) | H6 level (dBm) | MSD (dB) |
|---|---|---|---|---|---|
| Main Path | −101 | −91.2 | 11.0 | −88.2 | 13.8 |
| Diversity Path | −101 | −91.8 | 10.4 | −91.3 | 10.8 |
| After MRC | | | 7.7 | | 9.1 |

MSD Level for 7$^{th}$ Harmonic

Table 14 shows RF component isolation parameters of the DC_28A-n79A terminal to derive the MSD level at 6 GHz or lower.

TABLE 14

| | Option1: W/HTF | | | | Option2: W/O HTF | | | |
| | Primary | | Diversity | | Primary | | Diversity | |
| Parameter | Value | H7 level | Value | H7 level | Value | H7 level | Value | H7 level |
|---|---|---|---|---|---|---|---|---|
| B28 Tx in PA output | 28 | | 28 | | 28 | | 28 | |
| B28 PA H7 attenuation | 70 | −42 | 70 | −42 | 70 | −42 | 70 | −42 |
| B28 duplexer H7 attenuation | 30 | −72 | 30 | −72 | 30 | −72 | 30 | −72 |
| Harmonic filter | 25 | −97 | 25 | −97 | 0 | −72 | 0 | −72 |
| Low switch H7 | −80 | −79.9 | −80 | −79.9 | −80 | −71.4 | −80 | −71.4 |
| Diplexer attenuation | 27 | −106.9 | 27 | −106.9 | 27 | −98.4 | 27 | −98.4 |
| Antenna isolation | 0 | −106.9 | 10 | −116.9 | 0 | −98.4 | 10 | −108.4 |
| HB switch attenuation | 0.7 | −107.6 | 0.7 | −117.6 | 0.7 | −99.1 | 0.7 | −109.1 |
| HB switch H7 | −130 | −107.6 | −110 | −109.3 | −130 | −99.1 | −110 | −106.5 |
| n79 Rx filter atten. | 1.5 | −109.1 | 1.5 | −110.8 | 1.5 | −100.6 | 1.5 | −108.0 |
| n79 Rx filter H7 | −110 | −106.5 | −110 | −107.4 | −110 | −100.1 | −110 | −105.9 |
| B28 PA to NR B79 LNA isolation | 60 | −102.0 | 60 | −102.0 | 60 | −102.0 | 60 | −102.0 |
| Composite | | −100.7 | | −100.9 | | −97.9 | | −100.5 |

According to Table 14, the MSD level for DC_28A-n79A may be expressed as illustrated in Table 15 below.

TABLE 15

| | Thermal | W/HTF | | W/O HTF | |
| | | H6 level (dBm) | MSD (dB) | H6 level (dBm) | MSD (dB) |
|---|---|---|---|---|---|
| Main Path | −101 | −100.7 | 3.6 | −97.9 | 5.4 |
| Diversity Path | −101 | −100.9 | 3.5 | −100.5 | 3.7 |
| After MRC | | | 0.53 | | 1.5 |

Based on the above-described harmony analysis results, the present disclosure proposes as follows.

Proposal 1: For the harmonic problem, an MSD level must be defined for the NR band of the maximum of sixth harmonic to support the NSA DC operation. The 7th harmonic does not seriously impact on NR sensitivity.

2. IMD Problem for LTE Band and NR Refarming Band

The NR refarming band refers to a reused band, which means a frequency band used for LTE communication and also used for NR communication among frequency bands. For example, referring to Table 1 and Table 2 described above, the NR operating band n1 to the NR operating band n41 may be refarming bands which are also included in the LTE operating band.

Based on the coexistence analysis results for the NSA DC terminal, the MSD levels for the following four cases may be determined. When the MSD level is analyzed, a harmonic trap filter may be used.

$2^{nd}$ IMD: DC_1A-n77A, DC_3A-n77A, DC_3A-n78A
$3^{rd}$ IMD: DC_21A-n79A
$4^{th}$ IMD: DC_1A-n77A, DC_1A-n78A, DC_3A-n77A, DC_3A-n78A, DC_7A-n77A, DC_8A-n77A, DC_19A-n77A, DC_20A-n77A, DC_26A-n77A, DC_3A-n7A
$5^{th}$ IMD: DC_3A-n79A, DC_8A-n79A, DC_19A-n77A, DC_2A-n66A

Table 16 shows UE RF front-end component parameters for deriving an MSD level at 6 GHz or lower.

TABLE 16

| Component | UE ref. Architecture Cas-caded Diplexer Architecture DC_1A-n77A, DC_3A-n77A, DC_3A-n78A, DC_21A-n79A | | | |
|---|---|---|---|---|
| | IP2 (dBm) | IP3 (dBm) | IP4 (dBm) | IP5 (dBm) |
| Ant. Switch | 112 | 68 | 55 | 55 |
| Diplexer | 115 | 87 | 55 | 55 |

TABLE 16-continued

| Component | UE ref. Architecture Cas-caded Diplexer Architecture DC_1A-n77A, DC_3A-n77A, DC_3A-n78A, DC_21A-n79A | | | |
|---|---|---|---|---|
| | IP2 (dBm) | IP3 (dBm) | IP4 (dBm) | IP5 (dBm) |
| Duplexer | 100 | 75 | 55 | 53 |
| PA Forward | 28.0 | 32 | 30 | 28 |
| PA Reversed | 40 | 30.5 | 30 | 30 |
| LNA | 10 | 0 | 0 | −10 |

Table 17 shows isolation levels according to RF components.

TABLE 17

| Isolation Parameter | Value (dB) | Comment |
|---|---|---|
| Antenna to Antenna | 10 | Main antenna to diversity antenna |
| PA (out) to PA (in) | 60 | PCB isolation (PA forward mixing) |
| Diplexer | 25 | High/low band isolation |
| PA (out) to PA (out) | 60 | L-H/H-L cross-band |
| PA (out) to PA (out) | 50 | H-H cross-band |
| LNA (in) to PA (out) | 60 | L-H/H-L cross-band |
| LNA (in) to PA (out) | 50 | H-H cross-band |
| Duplexer | 50 | Tx band rejection at Rx band |

Here, the isolation level indicates how much strength of a signal is reduced at the corresponding frequency when the signal passes through an element or an antenna. For example, referring to Table 17, when the signal is transmitted from an antenna to an antenna, strength thereof may be reduced by 10 dB and when the signal is received at that frequency, strength thereof may be reduced by 50 dB.

Based on Table 16 and Table 17, the present disclosure proposes MSD levels as illustrated in Table 18 to Table 21.

Table 18 shows the MSD levels proposed for the second IMD.

TABLE 18

| DC bands | UL DC | IMD | | UL $F_c$ (MHz) | UL BW (MHz) | UL RB # | DL $F_c$ (MHz) | DL BW (MHz) | CF (dB) | MSD (dB) |
|---|---|---|---|---|---|---|---|---|---|---|
| DC_1A-n77A | 1 n77 | IMD2 | $|f_{B77} - f_{B1}|$ | 1930 4050 | 5 10 | 25 52 | 2120 4050 | 5 10 | 2.2 | 31.1 N/A |
| DC_3A-n77A | 3 n77 | IMD2 | $|f_{B77} - f_{B3}|$ | 1730 3555 | 5 10 | 25 52 | 1825 3555 | 5 10 | 2.5 | 31.3 N/A |
| DC_3A-n78A | 3 n78 | IMD2 | $|f_{B78} - f_{B3}|$ | 1730 3555 | 5 10 | 25 52 | 1825 3555 | 5 10 | 2.5 | 31.3 N/A |

Table 19 shows a proposed MSD level for a third IMD.

TABLE 19

| DC bands | UL DC | IMD | | UL $F_c$ (MHz) | UL BW (MHz) | UL RB # | DL $F_c$ (MHz) | DL BW (MHz) | CF (dB) | MSD (dB) |
|---|---|---|---|---|---|---|---|---|---|---|
| DC_21A-n79A | 21 n79 | IMD3 | $|f_{B79} - 2*f_{B21}|$ | 1457.5 4420.5 | 5 40 | 25 216 | 1505.5 4420.5 | 5 40 | 1.8 | 18.4 N/A |

Table 20 shows a proposed MSD level for a fourth IMD.

TABLE 20

| DC bands | UL DC | IMD | | UL $F_c$ (MHz) | UL BW (MHz) | UL RB # | DL $F_c$ (MHz) | DL BW (MHz) | CF (dB) | MSD (dB) |
|---|---|---|---|---|---|---|---|---|---|---|
| DC_1A-n77A | 1 n77 | IMD4 | $\|f_{B77} - 3*f_{B1}\|$ | 1930 3670 | 5 10 | 25 52 | 2120 3670 | 5 10 | 1.5 | 8.3 N/A |
| DC_1A-n78A | 1 n78 | IMD4 | $\|f_{B78} - 3*f_{B1}\|$ | 1930 3670 | 5 10 | 25 52 | 2120 3670 | 5 10 | 1.5 | 8.3 N/A |
| DC_3A-n77A | 3 n77 | IMD4 | $\|f_{B77} - 3*f_{B3}\|$ | 1770 3445 | 5 10 | 25 52 | 1865 3445 | 5 10 | 1.5 | 8.5 N/A |
| DC_3A-n78A | 3 n78 | IMD4 | $\|f_{B78} - 3*f_{B3}\|$ | 1770 3445 | 5 10 | 25 52 | 1865 3445 | 5 10 | 1.5 | 8.5 N/A |
| DC_7A-n77A | 7 n77 | IMD4 | $\|2*f_{B77} - 2*f_{B7}\|$ | 2560 3900 | 10 10 | 50 52 | 2680 3900 | 10 10 | 1.6 | 9.3 N/A |
| DC_8A-n77A | 8 n77 | IMD4 | $\|f_{B77} - 3*f_{B3}\|$ | 910 3685 | 5 10 | 25 52 | 955 3685 | 5 10 | 1.3 | 8.4 N/A |
| DC_19A-n77A | 19 n77 | IMD4 | $\|f_{B77} - 3*f_{B19}\|$ | 840 3405 | 5 10 | 25 52 | 885 3405 | 5 10 | 1.7 | 8.7 N/A |
| DC_20A-n77A | 20 n77 | IMD4 | $\|f_{B77} - 3*f_{B19}\|$ | 857 3387 | 5 10 | 25 52 | 816 3387 | 5 10 | 1.7 | 9.0 N/A |
| DC_26A-n77A | 26 n77 | IMD4 | $\|f_{B77} - 3*f_{B26}\|$ | 819 3321 | 5 10 | 25 52 | 864 3321 | 5 10 | 1.7 | 9.0 N/A |
| DC_3A-n7A | 3 n7 | IMD4 | $\|f_{B7} - 3*f_{B3}\|$ | 1740 2550 | 5 10 | 25 52 | 1835 2670 | 5 10 | 1.5 | N/A 7.5 |

Table 21 shows a proposed MSD level for a fifth IMD.

TABLE 21

| DC bands | UL DC | IMD | | UL $F_c$ (MHz) | UL BW (MHz) | UL RB # | DL $F_c$ (MHz) | DL BW (MHz) | CF (dB) | MSD (dB) |
|---|---|---|---|---|---|---|---|---|---|---|
| DC_3A-n79A | 3 n79 | IMD5 | $\|f_{B79} - 4*f_{B3}\|$ | 1712.5 4995 | 5 10 | 25 52 | 1807.5 4995 | 5 10 | 0.5 | 0.0 N/A |
| DC_8A-n79A | 8 n79 | IMD5 | $\|f_{B79} - 4*f_{B8}\|$ | 900 4545 | 5 10 | 25 52 | 945 4545 | 5 10 | 1.0 | 2.7 N/A |
| DC_19A-n77A | 19 n77 | IMD5 | $\|f_{B77} - 4*f_{B19}\|$ | 832.5 4195 | 5 10 | 25 52 | 877.5 4195 | 5 10 | 0.5 | 0.0 N/A |
| DC_2A-n66A | 2 n66 | IMD5 | $\|2*f_{B66} - 3*f_{B2}\|$ | 1860 1725.5 | 5 5 | 25 52 | 1940 2130 | 5 5 | 0.8 | N/A 2.0 |

Based on the MSD levels for the IMDs, the present disclosure proposes as follows.

Proposal 2: For the IMD problem, an MSD level must be defined for the NR band of a maximum of the fifth order IMD to support NSA DC operation. In addition, corresponding test setup and MSD level may be considered to designate the NSA terminal DC sensitivity level.

III. Third Disclosure

In the third disclosure, self-interference that occurs when a 5G NR terminal performing a DC operation (EN-DC) of the LTE band and the NR band transmits a dual-uplink signal is analyzed and a relaxed standard for sensitivity is proposed.

Table 22 shows self-interference that may occur in the LTE-NR DC combination of 3DL/2UL.

TABLE 22

| Downlink band setup | Uplink DC setup | harmonic | IMD | Interference due to small frequency isolation | MSD |
|---|---|---|---|---|---|
| B1 + n3 + n78 | DC_1A_n3A | $2^{nd}$ harmonic from n3 into n78 | $2^{nd}$ & $4^{th}$ IMDs into n78 | Yes | Harmonic problems will be covered in DC_n3A-n78A. $2^{nd}$ & $4^{th}$ IMDs problems will be FFS. Small freq. gap was covered in Table 7.3.1A-0bA in TS36.101 |
| | DC_1A_n78A | — | $2^{nd}$ IMD into n3 | — | $2^{nd}$ IMD problems will be FFS. |

TABLE 22-continued

| Downlink band setup | Uplink DC setup | harmonic | IMD | Interference due to small frequency isolation | MSD |
|---|---|---|---|---|---|
| B1 + n78 + n79 | DC_1A_n78A | — | $3^{rd}$ IMD into n79 | — | $3^{rd}$ IMD problem will be FFS. If consider synchronous TDD operation btw n78 and n79, MSD study is not necessary. |
| | DC_1A_n79A | — | $5^{th}$ IMDs into n78 | — | $5^{th}$ IMD problem will be FFS. If consider synchronous TDD operation btw n78 and n79, MSD study is not necessary. |
| B1 + n77 + n257 | DC_1A_n77A | $7^{th}$ & $8^{th}$ Harmonics from n77 into n257 | — | — | No harmonics problems by $7^{th}$ & $8^{th}$ order between FR1 and FR2 |
| | DC_1A_n257A | $2^{nd}$ harmonic from B1 into n77 | — | — | Harmonic problem already discussed and will be solved in DC_1A_n77A |
| B1 + n78 + n257 | DC_1A_n78A | $7^{th}$ & $8^{th}$ Harmonics from n78 into n257 | — | — | No harmonics problems by $7^{th}$ & $8^{th}$ order between FR1 and FR2 |
| | DC_1A_n257A | $2^{nd}$ harmonic from B1 into n78 | — | — | Harmonic problem already discussed and will be solved in DC_1A_n78A |
| B1 + n79 + n257 | DC_1A_n79A | $6^{th}$ Harmonics from n79 into n257 | — | — | Harmonic problem will be solved in DC_n79A-n257A ($6^{th}$ order) |
| | DC_1A_n257A | — | — | — | No issues |
| B3 + n1 + n78 | DC_3A_n1A | $2^{nd}$ harmonic from 3 into n78 | $2^{nd}$ & $4^{th}$ IMDs into n78 | Yes | Harmonic problems will be covered in DC_3A_n78A. $2^{nd}$ & $4^{th}$ IMDs problems same as DC_1A_n3A-n78A. Small freq. gap was covered in Table 7.3.1A-0bA in TS36.101 |
| | DC_3A_n78A | — | $5^{th}$ IMD into n1 | — | $5^{th}$ IMD problems will be FFS. |
| B3 + n77 + n79 | DC_3A_n77A | — | $3^{rd}$ & $4^{th}$ IMDs into n79 | — | RAN4 agreed the synchronous TDD operation btw n77 and n79, So MSD study are not necessary. |
| | DC_3A_n79A | $2^{nd}$ harmonic from B3 into B77 | $5^{th}$ IMD into B77 | — | Harmonic problem will be solved in DC_3A_n77A RAN4 agreed the synchronous TDD operation btw n77 and n79, So MSD study is not necessary. |
| B3 + n78 + n79 | DC_3A_n78A | — | $3^{rd}$ IMD into n79 | — | $3^{rd}$ IMD problem will be FFS. If consider synchronous TDD operation btw n78 and n79, MSD study is not necessary. |
| | DC_3A_n79A | $2^{nd}$ harmonic from B3 into B78 | $5^{th}$ IMD into B78 | — | Harmonic problem will be solved in DC_3A_n78A $5^{th}$ IMD problem will be FFS. If consider synchronous TDD operation btw n78 and n79, MSD study is not necessary. |
| B3 + n77 + n257 | DC_3A_n77A | $7^{th}$ & $8^{th}$ harmonics from n77 into n257 | — | — | No harmonics problems by $7^{th}$ & $8^{th}$ order between FR1 and FR2 |
| | DC_3A_n257A | $2^{nd}$ harmonic from B3 into B77 | — | — | Harmonic problem will be solved in DC_3A_n77A |

TABLE 22-continued

| Downlink band setup | Uplink DC setup | harmonic | IMD | Interference due to small frequency isolation | MSD |
|---|---|---|---|---|---|
| B3 + n78 + n257 | DC_3A_n78A | $7^{th}$ & $8^{th}$ harmonics from n78 into n257 | — | — | No harmonics problems by $7^{th}$ & $8^{th}$ order between FR1 and FR2 |
| | DC_3A_n257A | $2^{nd}$ harmonic from B3 into n78 | — | — | Harmonic problem will be solved in DC_3A_n78A |
| B3 + n79 + n257 | DC_3A_n79A | $6^{th}$ harmonic from n79 into n257 | — | — | Harmonic problem will be solved in DC_n79A-n257A ($6^{th}$ order) |
| | DC_3A_n257A | — | — | — | No issues |
| B5 + n78 + n257 | DC_5A_n78A | $7^{th}$ & $8^{th}$ harmonics from n78 into n257 | — | — | No harmonics problems by $7^{th}$ & $8^{th}$ order between FR1 and FR2 |
| | DC_5A_n257A | $4^{th}$ harmonic from B5 into n78 | — | — | Harmonic problem will be solved in DC_5A_n78A |
| B7 + n78 + n257 | DC_7A_n78A | $7^{th}$ & $8^{th}$ harmonics from n78 into n257 | — | — | No harmonics problems by $7^{th}$ & $8^{th}$ order between FR1 and FR2 |
| | DC_7A_n257A | — | — | — | No issues |
| B7 + n1 + n3 | DC_7A_n1A | — | — | — | No issues |
| | DC_7A_n3A | — | — | — | No issues |
| B7 + n1 + n78 | DC_7A_n1A | — | $4^{th}$ & $5^{th}$ IMDs into n78 | — | $4^{th}$ & $5^{th}$ IMDs problem will be FFS. |
| | DC_7A_n78A | — | $4^{th}$ IMD into n1 | — | $4^{th}$ IMD problem will be FFS. |
| B7 + n3 + n78 | DC_7A_n3A | $2^{nd}$ harmonic from n3 into n78 | $3^{rd}$ IMD into n78 | — | Harmonic problem will be solved in DC_n3A-n78A $3^{rd}$ IMD problem will be FFS. |
| | DC_7A_n78A | — | $3^{rd}$ & $4^{th}$ IMDs into n3 | — | $3^{rd}$ & $4^{th}$ IMDs problem will be FFS. |
| B19 + n77 + n79 | DC_19A_n77A | $6^{th}$ harmonic from B19 into n79 | $2^{nd}$, $3^{rd}$, $4^{th}$ & $5^{th}$ IMDs into n79 | — | Harmonic problem will be solved in DC_19A_n79A RAN4 agreed the synchronous TDD operation btw n77 and n79, So MSD study is not necessary. |
| | DC_19A_n79A | $4^{th}$ & $5^{th}$ harmonics from B19 into n77 | $2^{nd}$ & $3^{rd}$ IMDs into n77 | — | Harmonic problem will be solved in DC_19A_n77A RAN4 agreed the synchronous TDD operation btw n77 and n79, So MSD study is not necessary. |
| B19 + n78 + n79 | DC_19A_n78A | $6^{th}$ harmonic from B19 into n79 | $2^{nd}$, $3^{rd}$, $4^{th}$ & $5^{th}$ IMDs into n79 | — | Harmonic problem will be solved in DC_19A_n79A These IMDs problem are FFS. If consider synchronous TDD operation btw n78 and n79, MSD study is not necessary. |
| | DC_19A_n79A | $4^{th}$ harmonic from B19 into n78 | $2^{nd}$ & $3^{rd}$ IMDs into n78 | — | Harmonic problem will be solved in DC_19A_n78A These IMDs problem are FFS. If consider synchronous TDD operation btw n78 and n79, MSD study is not necessary. |
| B19 + n77 + n257 | DC_19A_n77A | $7^{th}$ & $8^{th}$ harmonics from n77 into n257 | — | — | No harmonics problems by $7^{th}$ & $8^{th}$ order between FR1 and FR2 |
| | DC_19A_n257A | $4^{th}$ & $5^{th}$ harmonics from B19 into n77 | — | — | Harmonic problem will be solved in DC_19A_n77A |

TABLE 22-continued

| Downlink band setup | Uplink DC setup | harmonic | IMD | Interference due to small frequency isolation | MSD |
|---|---|---|---|---|---|
| B19 + n78 + n257 | DC_19A_n78A | $7^{th}$ & $8^{th}$ harmonics from n78 into n257 | — | — | No harmonics problems by $7^{th}$ & $8^{th}$ order between FR1 and FR2 |
|  | DC_19A_n257A | $4^{th}$ harmonic from B19 into n78 | — | — | Harmonic problem will be solved in DC_19A_n78A |
| B19 + n79 + n257 | DC_19A_n79A | $6^{th}$ harmonic from n79 into n257 | — | — | Harmonic problem will be solved in DC_n79A-n257A ($6^{th}$ order) |
|  | DC_19A_n257A | $6^{th}$ harmonic from B19 into n79 | — | — | Harmonic problem will be solved in DC_19A_n79A |
| B20 + n1 + n3 | DC_20A_n1A | — | — | — | No issues |
|  | DC_20A_n3A | — | — | — | No issues |
| B20 + n1 + n78 | DC_20A_n1A | $4^{th}$ harmonic from B20 into n78 | $3^{rd}$ IMD into n78 | — | Harmonic problem will be solved in DC_20A_n78A. $3^{rd}$ IMD issue will be FFS |
|  | DC_20A_n78A | — | $3^{rd}$ IMD into n1 | — | $3^{rd}$ IMD issue will be FFS |
| B20 + n3 + n78 | DC_20A_n3A | $2^{nd}$ harmonic from n3 into n78 $4^{th}$ harmonic from B20 into n78 | $3^{rd}$ & $5^{th}$ IMDs into n78 | — | $3^{rd}$ & $5^{th}$ IMDs problem will be FFS. |
|  | DC_20A_n78A | — | $3^{rd}$ IMD into n3 | — | $3^{rd}$ IMD problem will be FFS |
| B21 + n77 + n79 | DC_21A_n77A | — | $2^{nd}$ & $4^{th}$ IMDs into n79 | — | RAN4 agreed the synchronous TDD operation btw n77 and n79, So MSD study is not necessary. |
|  | DC_21A_n79A | — | $2^{nd}$ IMD into n77 | — | RAN4 agreed the synchronous TDD operation btw n77 and n79, So MSD study is not necessary. |
| B21 + n78 + n79 | DC_21A_n78A | — | $2^{nd}$ & $4^{th}$ IMDs into n79 | — | These IMD problem are FFS. If consider synchronous TDD operation btw n78 and n79, MSD study is not necessary. |
|  | DC_21A_n79A | — | $2^{nd}$ IMD into n78 | — | The IMD problem are FFS. If consider synchronous TDD operation btw n78 and n79, MSD study is not necessary. |
| B21 + n77 + n257 | DC_21A_n77A | 7th & $8^{th}$ harmonics from n77 into n257 | — | — | No harmonics problems by $7^{th}$ & $8^{th}$ order between FR1 and FR2 |
|  | DC_21A_n257A | — | — | — | No issues |
| B21 + n78 + n257 | DC_21A_n78A | $7^{th}$ & $8^{th}$ harmonics from n78 into n257 | — | — | No harmonics problems by $7^{th}$ & $8^{th}$ order between FR1 and FR2 |
|  | DC_21A_n257A | — | — | — | No issues |
| B21 + n79 + n257 | DC_21A_n79A | — | — | — | Harmonic problem will be solved in DC_n79A-n257A ($6^{th}$ order) |
|  | DC_21A_n257 | — | — | — | No issues |

Table 23 shows self-interference that may occur in the LTE-NR DC combination of 4DL/2UL.

TABLE 23

| downlink band setup | uplink DC setup | harmonic | IMD | Interference due to small frequency isolation | MSD |
|---|---|---|---|---|---|
| B1 + B7 + n3 + n78 | DC_1A_n3A | $2^{nd}$ harmonic from n3 into n78 | $2^{nd}$ & $4^{th}$ IMDs into n78 | Yes | Harmonic problems will be covered in DC_n3A-n78A. $2^{nd}$ & $4^{th}$ IMDs problems will be covered in DC_1A_n3A-n78A. Small freq. gap was covered in Table 7.3.1A-0bA in TS36.101 |
| | DC_1A_n78A | — | $2^{nd}$ IMD into n3 $4^{th}$ IMD into B7 | — | These IMD problems will be covered in DC_1A-n3A-n78A and DC_1A-7A_n78A. |
| | DC_7A_n3A | $2^{nd}$ harmonic from n3 into n78 | $3^{rd}$ IMD into n78 | — | Harmonic problem will be solved in DC_n3A-n78A $3^{rd}$ IMD problem will be covered in DC_7A_n3A-n78A. |
| | DC_7A_n78A | — | $3^{rd}$ & $4^{th}$ IMDs into n3 $4^{th}$ IMD into n1 | — | These IMDs problem will be covered in DC_7A_n1A-n78A and DC_7A_n3A-n78A. |
| B1 + B20 + n3 + n78 | DC_1A_n3A | $2^{nd}$ harmonic from n3 into n78 | $2^{nd}$ & $4^{th}$ IMDs into n78 | Yes | Harmonic problems will be covered in DC_n3A-n78A. $2^{nd}$ & $4^{th}$ IMDs problems will be covered in DC_1A_n3A-n78A. Small freq. gap was covered in Table 7.3.1A-0bA in TS36.101 |
| | DC_1A_n78A | — | $2^{nd}$ IMD into n3 $5^{th}$ IMD into B20 | — | These IMD problems will be covered in DC_1A_n3A-n78A and DC_1A-20A_n78A |
| | DC_20A_n3A | $2^{nd}$ harmonic from n3 into n78 $4^{th}$ harmonic from B20 into n78 | $3^{rd}$ & $5^{th}$ IMDs into n78 | — | These harmonic problems will be covered in DC_n3A-n78A and DC_20A_n78A. These IMD problems will be covered in DC_20A_n3A-78A. |
| | DC_20A_n78A | — | $3^{rd}$ IMD into n3 $3^{rd}$ IMD into n1 | — | These IMD problems will be covered in DC_20A_n1A-n78A and DC_20A_n3A-n78A. |
| B3 + B7 + n1 + n78 | DC_3A_n1A | $2^{nd}$ harmonic from 3 into n78 | $2^{nd}$ & $4^{th}$ IMDs into n78 | Yes | Harmonic problems will be covered in DC_3A_n78A. These IMD problems will be covered in DC_3A_n1A-n78A. Small freq. gap was covered in Table 7.3.1A-0bA in TS36.101 |
| | DC_3A_n78A | — | $5^{th}$ IMD into n1 | — | $5^{th}$ IMD problems will be covered in DC_3A_n1A-n78A. |
| | DC_7A_n1A | — | $4^{th}$ & $5^{th}$ IMDs into n78 | — | $4^{th}$ & $5^{th}$ IMDs problem will be covered in DC_7A_n1A-n78A. |
| | DC_7A_n78A | — | $3^{rd}$ & $4^{th}$ IMDs into B3 $4^{th}$ IMD into n1 | — | These IMDs problem will be covered in DC_7A_n1A-n78A and DC_3A-7A-n78A. |
| B3 + B20 + n1 + n78 | DC_3A_n1A | $2^{nd}$ harmonic from 3 into n78 | $2^{nd}$ & $4^{th}$ IMDs into n78 | Yes | Harmonic problems will be covered in DC_3A_n78A. These IMD problems will be covered in DC_3A_n1A-n78A. Small freq. gap was covered in Table 7.3.1A-0bA in TS36.101 |
| | DC_3A_n78A | — | $5^{th}$ IMD into n1 | — | $5^{th}$ IMD problems will be covered in DC_3A_n1A-n78A. |
| | DC_20A_n1A | $4^{th}$ harmonic from B20 into n78 | $3^{rd}$ IMD into n78 | — | Harmonic problem will be solved in DC_20A_n78A $3^{rd}$ IMD issue will be covered in DC_20A_n1A-n78A |

TABLE 23-continued

| downlink band setup | uplink DC setup | harmonic | IMD | Interference due to small frequency isolation | MSD |
|---|---|---|---|---|---|
| | DC_20A_n78A | — | $3^{rd}$ IMD into B3<br>$3^{rd}$ IMD into n1 | — | These IMD problems will be covered in DC_20A_n1A-78A and DC_3A-20A_n78A. |
| B7 + B20 + n1 + n3 | DC_7A_n1A | — | $5^{th}$ IMD into B20 | — | The IMD issue should be covered in 3DL DC_7A-20A_n1A in TR37.863-02-01 |
| | DC_7A_n3A | — | $2^{nd}$ IMD into B20 | — | The IMD issue should be covered in 3DL DC_7A-20A_n3A w/2UL_DC_7A-n3A in TR37.863-02-01 |
| | DC_20A_n1A | — | — | — | No issue |
| | DC_20A_n3A | — | $2^{nd}$ & $3^{rd}$ IMDs into B7 | — | The IMD issue should be covered in 3DL DC_7A-20A_n3A w/2UL_DC_20A-n3A in TR37.863-02-01 |
| B7 + B20 + n1 + n78 | DC_7A_n1A | — | $5^{th}$ IMD into B20<br>$4^{th}$ & $5^{th}$ IMDs into n78 | — | The IMD issue should be covered in 3DL DC_7A-20A_n1A in TR37.863-02-01<br>$4^{th}$ & $5^{th}$ IMDs problem will be covered in DC_7A_n1A-n78A. |
| | DC_7A_n78A | — | $4^{th}$ IMD into n1<br>$2^{nd}$ & $5^{th}$ IMD into B20 | — | These IMD problems will be covered in DC_7A_n1A-n78A and DC_7A-20A_n78A. |
| | DC_20A_n1A | $4^{th}$ harmonic from B20 into n78 | $3^{rd}$ IMD into n78 | — | Harmonic problem will be solved in DC_20A_n78A<br>$3^{rd}$ IMD issue will be covered in DC_20A_n1A-n78A |
| | DC_20A_n78A | — | $3^{rd}$ IMD into n1<br>$2^{nd}$ IMD into B7 | — | These IMDs issue will be covered in DC_20A_n1A-n78A and DC_7A-20A_n78A |
| B7 + B20 + n3 + n78 | DC_7A_n3A | $2^{nd}$ harmonic from n3 into n78 | $2^{nd}$ IMD into B20<br>$3^{rd}$ IMD into n78 | — | Harmonic problem will be solved in DC_n3A-n78A<br>These IMDs issue will be covered in DC_7A-20A_n3A and DC_7A_n3A-n78A |
| | DC_7A_n78A | — | $3^{rd}$ & $4^{th}$ IMDs into n3<br>$2^{nd}$ & $5^{th}$ IMD into B20 | — | These IMD problems will be covered in DC_7A_n3A-n78A and DC_7A-20A_n78A. |
| | DC_20A_n3A | $2^{nd}$ harmonic from n3 into n78<br>$4^{th}$ harmonic from B20 into n78 | $2^{nd}$ & $3^{rd}$ IMDs into B7<br>$3^{rd}$ & $5^{th}$ IMDs into n78 | — | Harmonic problem will be solved in DC_n3A-n78A and DC_20A-n78A.<br>The IMD issue should be covered in DC_7A-20A-n3A and DC_20A_n3A-n78A |
| | DC_20A_n78A | — | $3^{rd}$ IMD into n3<br>$2^{nd}$ IMD into B7 | — | These IMD problems will be covered in DC_20A_n3A-n78A and DC_7A-20A_n78A. |

Table 24 shows self-interference that may occur in the LTE-NR DC combination of 5DL/2UL.

TABLE 24

| Downlink band setup | Uplink DC setup | harmonic | IMD | Interference due to small frequency isolation | MSD |
|---|---|---|---|---|---|
| B1 + B7 + B20 + n3 + n78 | DC_1A_n3A | $2^{nd}$ harmonic from n3 into n78 | $2^{nd}$ & $4^{th}$ IMDs into n78 | Yes | Harmonic problems will be covered in DC_n3A-n78A. $2^{nd}$ & $4^{th}$ IMDs problems will be covered in DC_1A_n3A-n78A. Small freq. gap was covered in Table 7.3.1A-0bA in TS36.101 |
| | DC_1A_n78A | — | $2^{nd}$ IMD into n3 $5^{th}$ IMD into B20 $4^{th}$ IMD into B7 | — | These IMD problems will be covered in DC_1A_n3A-n78A, DC_1A-20A_n78A and DC_1A-7A_n78A. |
| | DC_7A_n3A | $2^{nd}$ harmonic from n3 into n78 | $2^{nd}$ IMD into B20 $3^{rd}$ IMD into n78 | — | Harmonic problem will be solved in DC_n3A-n78A These IMDs issue will be covered in DC_7A-20A_n3A and DC_7A_n3A-n78A |
| | DC_7A_n78A | — | $4^{th}$ IMD into B1 $3^{rd}$ & $4^{th}$ IMDs into n3 $2^{nd}$ & $5^{th}$ IMD into B20 | — | These IMD problems will be covered in DC_1A-7A_n78A, DC_7A_n3A-n78A and DC_7A-20A_n78A. |
| | DC_20A_n3A | $2^{nd}$ harmonic from n3 into n78 | $2^{nd}$ & $3^{rd}$ IMDs into B7 $3^{rd}$ & $5^{th}$ IMDs into n78 | — | Harmonic problems will be solved in CA_n3A-n78A The $2^{nd}$ & $3^{rd}$ IMDs issue should be covered in 3DL DC_7A-20A_n3A w/2UL_DC_20A-n3A in TR37.863-02-01. The $3^{rd}$&$5^{th}$ IMDs issue should be covered in 3DL DC_20A_n3A-n78A w/2UL_DC_20A-n3A. |
| | DC_20A_n78A | — | $3^{rd}$ IMD into B1 $3^{rd}$ IMD into n3 $2^{nd}$ IMD into B7 | — | These IMD problems will be covered in DC_1A-20A_n78A, DC_20A_n3A-n78A and DC_7A-20A_n78A. |
| B3 + B7 + B20 + n1 + n78 | DC_3A_n1A | $2^{nd}$ harmonic from B3 into n78 | $2^{nd}$ & $4^{th}$ IMDs into n78 | Yes | Harmonic problems will be covered in DC_3A_n78A. These IMD problems will be covered in DC_3A_n1A-n78A. Small freq. gap was covered in Table 7.3.1A-0bA in TS36.101 |
| | DC_3A_n78A | — | $5^{th}$ IMD into n1 | — | $5^{th}$ IMD problems will be covered in DC_3A_n1A-n78A. |
| | DC_7A_n1A | — | $5^{th}$ IMD into B20 $4^{th}$ & $5^{th}$ IMDs into n78 | — | The IMD issue should be covered in 3DL DC_7A-20A_n1A in TR37.863-02-01 $4^{th}$ & $5^{th}$ IMDs problem will be covered in DC_7A_n1A-n78A. |
| | DC_7A_n78A | — | $4^{th}$ IMD into n1 $3^{rd}$ & $4^{th}$ IMDs into B3 $2^{nd}$ & $5^{th}$ IMD into B20 | — | These IMD problems will be covered in DC_7A_n1A_n78A, DC_3A-7A-n78A and DC_7A-20A_n78A. |
| | DC_20A_n1A | $4^{th}$ harmonic from B20 into n78 | $3^{rd}$ IMD into n78 | — | Harmonic problem will be solved in DC_20A_n78A $3^{rd}$ IMD issue will be covered in DC_20A_n1A-n78A |

TABLE 24-continued

| Downlink band setup | Uplink DC setup | harmonic | IMD | Interference due to small frequency isolation | MSD |
|---|---|---|---|---|---|
| | DC__20A__n78A | — | $3^{rd}$ IMD into n1<br>$3^{rd}$ IMD into B3<br>$2^{nd}$ IMD into B7 | — | These IMD problems will be covered in DC__20A__n1A__n78A, DC__3A-20A__n78A and DC__7A-20A__n78A. |

On the basis of the assumptions according to Table 22 to Table 24, Table 25 proposes MST test setup based on self-interference. Since the MSD levels are measurement results, they may have an error of ±1 dB.

TABLE 25

| DC bands | UL DC | IMD | | UL $F_c$ (MHz) | UL BW (MHz) | UL RB # | DL $F_c$ (MHz) | DL BW (MHz) | CF (dB) | MSD (dB) |
|---|---|---|---|---|---|---|---|---|---|---|
| DC__1A__n3A-n78A | 1 | IMD2 | $|f_{B1} + f_{n3}|$ | 1950 | 5 | 25 | 2140 | 5 | 2.1 | N/A |
| | n3 | | | 1750 | 5 | 25 | 1845 | 5 | | |
| | n78 | | | 3700 | 10 | 52 | 3700 | 10 | | 28.4 |
| | 1 | IMD4 | $|3*f_{n3} - f_{B1}|$ | 1950 | 5 | 25 | 2140 | 5 | 1.2 | N/A |
| | n3 | | | 1770 | 5 | 25 | 1865 | 5 | | |
| | n78 | | | 3360 | 10 | 52 | 3360 | 10 | | 11.2 |
| | 1 | IMD2 | $|f_{n78} - f_{B1}|$ | 1950 | 5 | 25 | 2140 | 5 | 1.9 | N/A |
| | n78 | | | 3780 | 10 | 52 | 3780 | 10 | | |
| | n3 | | | 1735 | 5 | 25 | 1830 | 5 | | 27.9 |
| DC__1A__n78A-n79A | 1 | IMD3 | $|2*f_{n78} - f_{B1}|$ | 1950 | 5 | 25 | 2140 | 5 | 1.6 | N/A |
| | n78 | | | 3410 | 10 | 52 | 3410 | 10 | | |
| | n79 | | | 4870 | 40 | 216 | 4870 | 40 | | 15.9 |
| | 1 | IMD5 | $|2*f_{n79} - 3*f_{B1}|$ | 1950 | 5 | 25 | 2140 | 5 | 0.4 | N/A |
| | n79 | | | 4670 | 40 | 216 | 4670 | 40 | | |
| | n78 | | | 3490 | 10 | 52 | 3490 | 10 | | 4.6 |
| DC__3A__n1A-n78A | n1 | IMD2 | $|f_{n1} + f_{B3}|$ | 1950 | 5 | 25 | 2140 | 5 | 2.1 | N/A |
| | 3 | | | 1750 | 5 | 25 | 1845 | 5 | | |
| | n78 | | | 3700 | 10 | 52 | 3700 | 10 | | 28.4 |
| | n1 | IMD4 | $|3*f_{B3} - f_{n1}|$ | 1950 | 5 | 25 | 2140 | 5 | 1.2 | N/A |
| | 3 | | | 1770 | 5 | 25 | 1865 | 5 | | |
| | n78 | | | 3360 | 10 | 52 | 3360 | 10 | | 11.2 |
| | 3 | IMD5 | $|2*f_{n78} - 3*f_{B3}|$ | 1770 | 5 | 25 | 1865 | 5 | 0.3 | N/A |
| | n78 | | | 3720 | 10 | 52 | 3720 | 10 | | |
| | n1 | | | 1940 | 5 | 25 | 2130 | 5 | | 3.5 |
| DC__3A__n78A-n79A | 3 | IMD3 | $|2*f_{n78} - f_{B3}|$ | 1770 | 5 | 25 | 1865 | 5 | 1.7 | N/A |
| | n78 | | | 3340 | 10 | 52 | 3340 | 10 | | |
| | n79 | | | 4910 | 40 | 216 | 4910 | 40 | | 16.3 |
| | 3 | IMD5 | $|2*f_{n79} - 3*f_{B3}|$ | 1770 | 5 | 25 | 1865 | 5 | 0.5 | N/A |
| | n79 | | | 4510 | 40 | 216 | 4510 | 40 | | |
| | n78 | | | 3710 | 10 | 52 | 3710 | 10 | | 4.2 |
| DC__7A__n1A-n78A | n1 | IMD4 | $|f_{B7} - 3*f_{n1}|$ | 1970 | 5 | 25 | 2160 | 5 | 1.2 | N/A |
| | 7 | | | 2520 | 5 | 25 | 2640 | 5 | | |
| | n78 | | | 3390 | 10 | 52 | 3390 | 10 | | 10.1 |
| | n1 | IMD5 | $|3*f_{B7} - 2*f_{n1}|$ | 1970 | 5 | 25 | 2160 | 5 | 0.3 | N/A |
| | 7 | | | 2520 | 5 | 25 | 2640 | 5 | | |
| | n78 | | | 3620 | 10 | 52 | 3620 | 10 | | 3.8 |
| | 7 | IMD4 | $|2*f_{n78} - 2*f_{B7}|$ | 2530 | 5 | 25 | 2650 | 5 | 0.9 | N/A |
| | n78 | | | 3610 | 10 | 52 | 3610 | 10 | | |
| | n1 | | | 1970 | 5 | 25 | 2160 | 5 | | 9.0 |
| DC__7A__n3A-n78A | 7 | IMD3 | $|2*f_{B7} - f_{n3}|$ | 2560 | 5 | 25 | 2680 | 5 | 1.5 | N/A |
| | n3 | | | 1730 | 5 | 25 | 1825 | 5 | | |
| | n78 | | | 3390 | 10 | 52 | 3390 | 10 | | 16.1 |
| | 7 | IMD3 | $|2*f_{B7} - f_{n78}|$ | 2565 | 5 | 25 | 2685 | 5 | 1.4 | N/A |
| | n78 | | | 3310 | 10 | 52 | 3310 | 10 | | |
| | n3 | | | 1725 | 5 | 25 | 1820 | 5 | | 15.6 |
| | 7 | IMD4 | $|2*f_{n78} - 2*f_{B7}|$ | 2565 | 5 | 25 | 2685 | 5 | 0.8 | N/A |
| | n78 | | | 3480 | 10 | 52 | 3480 | 10 | | |
| | n3 | | | 1735 | 5 | 25 | 1830 | 5 | | 9.2 |

TABLE 25-continued

| DC bands | UL DC | IMD | IMD | UL F$_c$ (MHz) | UL BW (MHz) | UL RB # | DL F$_c$ (MHz) | DL BW (MHz) | CF (dB) | MSD (dB) |
|---|---|---|---|---|---|---|---|---|---|---|
| DC_19A_n78A-n79A | 19 | IMD2 | $\|f_{n78} + f_{B19}\|$ | 835 | 5 | 25 | 880 | 5 | 2.4 | N/A |
| | n78 | | | 3680 | 10 | 52 | 3680 | 10 | | |
| | n79 | | | 4515 | 40 | 216 | 4515 | 40 | | 29.3 |
| | 19 | IMD3 | $\|f_{n78} + 2*f_{B19}\|$ | 835 | 5 | 25 | 880 | 5 | 2.0 | N/A |
| | n78 | | | 3310 | 10 | 52 | 3310 | 10 | | |
| | n79 | | | 4980 | 40 | 216 | 4980 | 40 | | 16.8 |
| | 19 | IMD4 | $\|2*f_{n78} - 2*f_{B19}\|$ | 835 | 5 | 25 | 880 | 5 | 1.3 | N/A |
| | n78 | | | 3310 | 10 | 52 | 3310 | 10 | | |
| | n79 | | | 4950 | 40 | 216 | 4950 | 40 | | 11.5 |
| | 19 | IMD5 | $\|2*f_{n78} - 3*f_{B19}\|$ | 835 | 5 | 25 | 880 | 5 | 0.7 | N/A |
| | n78 | | | 3680 | 10 | 52 | 3680 | 10 | | |
| | n79 | | | 4855 | 40 | 216 | 4855 | 40 | | 5.2 |
| | 19 | IMD2 | $\|f_{n79} - f_{B19}\|$ | 835 | 5 | 25 | 880 | 5 | 2.2 | N/A |
| | n79 | | | 4550 | 40 | 216 | 4550 | 40 | | |
| | n78 | | | 3715 | 10 | 52 | 3715 | 10 | | 28.8 |
| | 19 | IMD3 | $\|f_{n79} - 2*f_{B19}\|$ | 835 | 5 | 25 | 880 | 5 | 1.6 | N/A |
| | n79 | | | 4980 | 40 | 216 | 4980 | 40 | | |
| | n78 | | | 3310 | 10 | 52 | 3310 | 10 | | 16.3 |
| DC_20A_n1A-n78A | 20 | IMD3 | $\|f_{n1} + 2*f_{B20}\|$ | 845 | 5 | 25 | 804 | 5 | 1.5 | N/A |
| | n1 | | | 1940 | 5 | 25 | 2130 | 5 | | |
| | n78 | | | 3630 | 10 | 52 | 3630 | 10 | | 16.0 |
| | 20 | IMD3 | $\|f_{n78} - 2*f_{B20}\|$ | 835 | 5 | 25 | 794 | 5 | 1.3 | N/A |
| | n78 | | | 3790 | 10 | 52 | 3790 | 10 | | |
| | n1 | | | 1930 | 5 | 25 | 2120 | 5 | | 15.3 |
| DC_20A_n3A-n78A | 20 | IMD3 | $\|2*f_{B20} + f_{n3}\|$ | 845 | 5 | 25 | 804 | 5 | 1.5 | N/A |
| | n3 | | | 1730 | 5 | 25 | 1825 | 5 | | |
| | n78 | | | 3420 | 10 | 52 | 3420 | 10 | | 16.1 |
| | 20 | IMD5 | $\|2*f_{B20} - 3*f_{n3}\|$ | 845 | 5 | 25 | 804 | 5 | 0.4 | N/A |
| | n3 | | | 1730 | 5 | 25 | 1825 | 5 | | |
| | n78 | | | 3500 | 10 | 52 | 3500 | 10 | | 4.5 |
| | 20 | IMD3 | $\|2*f_{B20} - 2*f_{n78}\|$ | 845 | 5 | 25 | 804 | 5 | 1.3 | N/A |
| | n78 | | | 3550 | 10 | 52 | 3550 | 10 | | |
| | n3 | | | 1765 | 5 | 25 | 1860 | 5 | | 15.7 |
| DC_21A_n78A-n79A | 21 | IMD2 | $\|f_{n78} + f_{B21}\|$ | 1453 | 5 | 25 | 1501 | 5 | 2.6 | N/A |
| | n78 | | | 3420 | 10 | 52 | 3420 | 10 | | |
| | n79 | | | 4873 | 40 | 216 | 4873 | 40 | | 30.1 |
| | 21 | IMD4 | $\|2*f_{n78} - 2*f_{B21}\|$ | 1453 | 5 | 25 | 1501 | 5 | 1.0 | N/A |
| | n78 | | | 3780 | 10 | 52 | 3780 | 10 | | |
| | n79 | | | 4654 | 40 | 21 | 4654 | 40 | | 11.3 |
| | 21 | IMD2 | $\|f_{n79} - f_{B21}\|$ | 1453 | 5 | 25 | 1501 | 5 | 2.5 | N/A |
| | n79 | | | 4940 | 40 | 216 | 4940 | 40 | | |
| | n78 | | | 3487 | 10 | 52 | 3487 | 10 | | 29.8 |

Here, the DC harmonic problem is also present between 6 GHz or lower and mmWave as shown in Table 26 below.

TABLE 26

| LTE band | | | NR band (MHz) | |
|---|---|---|---|---|
| NR band (FR1) | UL range (MHz) | Harm. Order | 26500-29500 Harmonic range (MHz) | harmonic/IMD |
| n79 | 4400-5000 | 6x | 26400-30000 | 1) Harmonic into NR (worst case) 2) No IMD into n79 3) No IMD into n257 |

According to Table 26, since $6^{th}$ harmonic falls on the reception band of n257, the worst case in the harmonic problem according to the DC band combination is DC_n79A-n257A. Thus, in the third disclosure, sixth harmonic in the DC_n79A-n257A combination is examined. Hereinafter, impact of the harmonic which may fall from mmWave to NR band is examined.

Analysis of Harmonic in NR (n257)

Currently, an LTE (4G) modem and a 5G (NR) modem may be separately developed and fused as telephony elements. In addition, the antenna may be used separately in the LTE band and the mmWave NR band. Based on the RF architecture, the MSD level in the n257 by the sixth harmonic may be derived.

Table 27 shows RF component isolation parameters of the DC_n79A-n257A terminal to derive the MSD level in mmWave.

TABLE 27

| | Option 1: W/O HTF Primary | |
|---|---|---|
| Parameter | Value | H6 level |
| n79 Tx in PA output | 28 | |
| n79 PA H6 attenuation | 65 | −37 |
| n79 duplexer H6 attenuation | 30 | −67 |
| Harmonic filter | 0 | −67 |
| HB switch H6 | −100 | −67 |
| Diplexer attenuation | 25 | −92.0 |
| Antenna isolation | 10 | −102.0 |
| mmW switch attenuation | 0.7 | −102.7 |
| mmW switch H6 | −110 | −102.0 |
| n257 Rx filter atten. | 1.5 | −103.5 |
| n257 Rx filter H6 | −110 | −102.6 |
| n79 PA to n257 LNA isolation | 60 | −97.0 |
| Composite | | −95.9 |

Table 28 shows an MSD level for the DC_n79A-n257A derived from Table 27. More precisely, it represents an MSD level for NR band n257 having a channel bandwidth (CBW) of 50 MHz.

TABLE 28

|  | | W/O HTF | |
| --- | --- | --- | --- |
|  | Thermal | H6 level (dBm) | Estimated Sensitivity (dB) |
| Main Path | −94.8 | −95.9 | −92.3 |
| Current sensitivity level at n257 | | | [−92.1~−85.7] dBm/50 MHz |

Based on the MSD in Table 28, the MSD is proposed as follows.
Proposal 1: MSD based on sixth harmonic in DC_n79A-n257A may be 0 dB Other MSD Analysis Table 29 shows terminal RF front-end component parameters for deriving MSD levels at 6 GHz or lower.

TABLE 29

| | Triplexer-diplexer Architecture w/separate ant. DC_1A-42A_n79A, DC_3A-42A_n79A, DC_19A-42A_n79A | | | |
| --- | --- | --- | --- | --- |
| UE ref. Architecture Component | IP2 (dBm) | IP3 (dBm) | IP4 (dBm) | IP5 (dBm) |
| Ant. Switch | 112 | 68 | 55 | 55 |
| Triplexer | 115 | 82 | 55 | 55 |
| Quadplexer | 110 | 72 | 55 | 52 |
| Diplexer | 115 | 87 | 55 | 55 |
| Duplexer | 100 | 75 | 55 | 53 |
| PA Forward | 28.0 | 32 | 30 | 28 |
| PA Reversed | 40 | 30.5 | 30 | 30 |
| LNA | 10 | 0 | 0 | −10 |

Table 30 shows isolation levels according to RF components.

TABLE 30

| Isolation Parameter | Value (dB) | Comment |
| --- | --- | --- |
| Antenna to Antenna | 10 | Main antenna to diversity antenna |
| PA (out) to PA (in) | 60 | PCB isolation (PA forward mixing) |
| Triplexer | 20 | High/low band isolation |
| Quadplexer | 20 | L-L or H-M band isolation |
| Diplexer | 25 | High/low band isolation |
| PA (out) to PA (out) | 60 | L-H/H-L cross-band |
| PA (out) to PA (out) | 50 | H-H cross-band |
| LNA (in) to PA (out) | 60 | L-H/H-L cross-band |
| LNA (in) to PA (out) | 50 | H-H cross-band |
| Duplexer | 50 | Tx band rejection at Rx band |

Based on Table 29 and Table 30, the MSD levels are proposed as illustrated in Table 31. Since the MSD levels correspond to measurement results, they may have an error of about ±1 dB.

TABLE 31

| E − 2*UTRA Band/Channel bandwidth/$N_{RB}$/Duplex mode | | | | | | | | |
| --- | --- | --- | --- | --- | --- | --- | --- | --- |
| EUTRA/NR DC | | UL/DL | | | | | | |
| DL Configuration | UL Configuration | EUTRA/ NR band | UL $F_c$ (MHz) | BW (MHz) | UL $C_{LRB}$ | DL $F_c$ (MHz) | MSD (dB) | Duplex mode | Source of IMD |
| DC_1A-42A_n79A | DC_42A_n79A | 1 | 1975 | 5 | 25 | 2165 | 16.2 | FDD | IMD3 |
| | | 42 | 3402.5 | 5 | 25 | 3402.5 | N/A | TDD | N/A |
| | | n79 | 4640 | 40 | 216 | 4640 | N/A | | N/A |
| | DC_1A_n79A | 1 | 1977.5 | 5 | 25 | 2167.5 | N/A | FDD | N/A |
| | | 42 | 3490 | 5 | 25 | 3490 | 4.5 | TDD | IMD5 |
| | | n79 | 4420 | 40 | 216 | 4420 | N/A | | N/A |
| DC_3A-42A_n79A | DC_42A_n79A | 3 | 1760 | 5 | 25 | 1855 | 17.1 | FDD | IMD3 |
| | | 42 | 3402.5 | 5 | 25 | 3402.5 | N/A | TDD | N/A |
| | | n79 | 4950 | 40 | 216 | 4950 | N/A | | N/A |
| | DC_3A_n79A | 3 | 1780 | 5 | 25 | 1875 | N/A | FDD | N/A |
| | | 42 | 3500 | 5 | 25 | 3500 | 3.9 | TDD | IMD5 |
| | | n79 | 4420 | 40 | 216 | 4420 | N/A | | N/A |
| DC_19A-42A_n79A | DC_42A_n79A | 19 | 842.5 | 5 | 25 | 887.5 | 20.6 | FDD | IMD2 |
| | | 42 | 3517.5 | 5 | 25 | 3517.5 | N/A | TDD | N/A |
| | | n79 | 4420 | 40 | 216 | 4420 | N/A | | N/A |

Also, the MSD due to the occurrence of the IMD needs to specify a sensitivity level (desense level) for the DC band combination (LTE (3DL/1UL)+NR (1DL/1UL)) having the IMD problem. Table 32 below shows the IMD problem for LTE (3DL/1UL)+NR (1DL/1UL) DC band combinations.

The test setup and MSD levels are defined in the MSD requirements of TR 37.863-02-01 and TS 38.101-3.

The above description can be realized by hardware.

Figure 10:
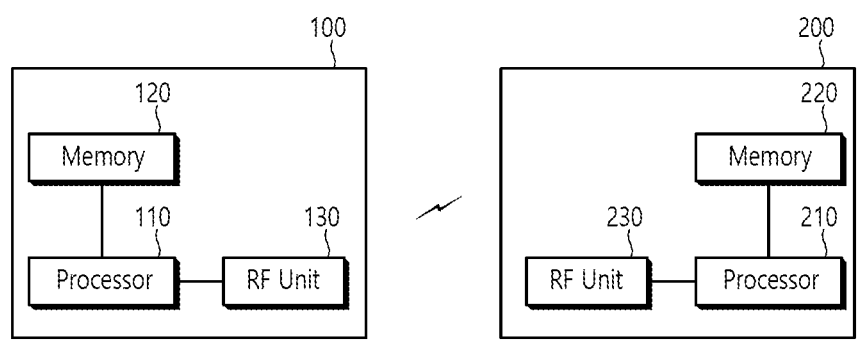
FIG. 10 is a block diagram illustrating a wireless communication system in which a disclosure of the present specification is implemented.

FIG. 10 is a block diagram illustrating a wireless communication system in which a disclosure of the present specification is implemented.

TABLE 32

| Downlink band setup | Uplink DC setup | Harmonic | IMD | Interference due to small frequency isolation | MSD |
|---|---|---|---|---|---|
| B1 + B18 + B28 + n77 | DC_1A-n77A | | $5^{th}$ IMD into B18<br>$5^{th}$ IMD into B28 | — | $5^{th}$ IMD will be discussed later |
| | DC_18A-n77A | — | $3^{rd}$ IMD into B1<br>$5^{th}$ IMD into B28 | — | $3^{rd}$ & $5^{th}$ IMD will be discussed later |
| | DC_28A-n77A | | $3^{rd}$ IMD into B1<br>$5^{th}$ IMD into B18 | — | $3^{rd}$ & $5^{th}$ IMD will be discussed later |
| B1 + B18 + B28 + n78 | DC_1A-n78A | | $5^{th}$ IMD into B18<br>$5^{th}$ IMD into B28 | — | $5^{th}$ IMD will be discussed later |
| | DC_18A-n78A | | $3^{rd}$ IMD into B1 | — | $3^{rd}$ IMD will be discussed later |
| | DC_28A-n78A | — | $3^{rd}$ IMD into B1<br>$5^{th}$ IMD into B18 | — | $3^{rd}$ & $5^{th}$ IMD will be discussed later |

Based on Table 32, test setup and MSD levels are proposed as illustrated in Table 33. Since the MSD levels correspond to measurement results, they may have an error of about ±1 dB.

The base station 200 includes a processor 210, a memory 220, and a radio frequency (RF) unit 230. The memory 220 is connected with the processor 210 to store various pieces of information for driving the processor 210. The RF unit

TABLE 33

| DC bands | UL DC | | IMD | UL $F_c$ (MHz) | UL BW (MHz) | UL RB # | DL $F_c$ (MHz) | DL BW (MHz) | CF (dB) | MSD (dB) |
|---|---|---|---|---|---|---|---|---|---|---|
| DC_1A-18A-28A_n77A | 1 | | IMD5 | $|2*f_{B77} - 3*f_{B1}|$ | 1960 | 5 | 25 | 2150 | 5 | 0.7 | N/A |
| | n77 | | | | 3330 | 10 | 52 | 3330 | 10 | | |
| | 28 | | | | 725 | 5 | 25 | 780 | 5 | | 4.3 |
| | 18 | | IMD3 | $|2*f_{B18} - f_{B77}|$ | 825 | 5 | 25 | 870 | 5 | 1.8 | N/A |
| | n77 | | | | 3770 | 10 | 52 | 3770 | 10 | | |
| | 1 | | | | 1930 | 5 | 25 | 2120 | 5 | | 16.4 |
| | 18 | | IMD5 | $|4*f_{B18} - f_{B77}|$ | 820 | 5 | 25 | 865 | 5 | 0.7 | N/A |
| | n77 | | | | 4058 | 10 | 52 | 4058 | 10 | | |
| | 28 | | | | 723 | 5 | 25 | 778 | 5 | | 4.4 |
| | 28 | | IMD3 | $|2*f_{B28} - f_{B77}|$ | 740 | 5 | 25 | 795 | 5 | 1.5 | N/A |
| | n77 | | | | 3630 | 10 | 52 | 3630 | 10 | | |
| | 1 | | | | 1960 | 5 | 25 | 2150 | 5 | | 15.8 |
| | 28 | | IMD5 | $|4*f_{B28} - f_{B77}|$ | 723 | 5 | 25 | 778 | 5 | 0.5 | N/A |
| | n77 | | | | 3757 | 10 | 52 | 3757 | 10 | | |
| | 18 | | | | 820 | 5 | 25 | 865 | 5 | | 3.9 |
| DC_1A-18A-28A_n78A | 1 | | IMD5 | $|3*f_{B1} - 2*f_{n78}|$ | 1970 | 5 | 25 | 2160 | 5 | 0.6 | N/A |
| | n78 | | | | 3352 | 10 | 52 | 3352 | 10 | | |
| | 28 | | | | 739 | 5 | 25 | 794 | 5 | | 4.2 |
| | 18 | | IMD3 | $|2*f_{B18} - f_{B78}|$ | 819 | 5 | 25 | 864 | 5 | 1.8 | N/A |
| | n78 | | | | 3758 | 10 | 52 | 3758 | 10 | | |
| | 1 | | | | 1930 | 5 | 25 | 2120 | 5 | | 16.4 |
| | 28 | | IMD3 | $|2*f_{B28} - f_{B78}|$ | 740 | 5 | 25 | 795 | 5 | 1.5 | N/A |
| | n78 | | | | 3630 | 10 | 52 | 3630 | 10 | | |
| | 1 | | | | 1960 | 5 | 25 | 2150 | 5 | | 15.7 |
| | 28 | | IMD5 | $|4*f_{B28} - f_{n78}|$ | 723 | 5 | 25 | 778 | 5 | 0.5 | N/A |
| | n78 | | | | 3756 | 10 | 52 | 3756 | 10 | | |
| | 18 | | | | 819 | 5 | 25 | 864 | 5 | | 3.8 |

230 is connected with the processor 210 to transmit and/or receive a radio signal. The processor 210 implements a function, a process, and/or a method which are proposed. In the aforementioned embodiment, the operation of the base station may be implemented by the processor 210.

UE 100 includes a processor 110, a memory 120, and an RF unit 130. The memory 120 is connected with the processor 110 to store various pieces of information for driving the processor 110. The RF unit 130 is connected with the processor 110 to transmit and/or receive the radio signal. The processor 110 implements a function, a process, and/or a method which are proposed.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A device configured to operate in a wireless system, the device comprising:
a transceiver configured with an Evolved Universal Terrestrial Radio Access (E-UTRA)-New Radio (NR) Dual Connectivity (EN-DC),
wherein the EN-DC is configured to use two bands,
a processor operably connectable to the transceiver,
wherein the processor is configured to:
control the transceiver to receive a downlink signal,
control the transceiver to transmit an uplink signal via the two bands,
wherein a value of Maximum Sensitivity Degradation (MSD) is applied to a reference sensitivity for receiving the downlink signal,
wherein the value of the MSD is pre-configured for a combination of bands 21 and n79,
wherein the value of the MSD is 18.4 dB for band 21 based on the combination of bands 21 and n79.

2. The device of claim 1,
wherein for the combination of bands 21 and n79, the band 21 is used for the E-UTRA and the band n79 is used for the NR.

3. A device configured to operate in a wireless system, the device comprising:
a transceiver configured with an Evolved Universal Terrestrial Radio Access (E-UTRA)-New Radio (NR) Dual Connectivity (EN-DC),
wherein the EN-DC is configured to use three bands,
a processor operably connectable to the transceiver,
wherein the processer is configured to:
control the transceiver to receive a downlink signal,
control the transceiver to transmit an uplink signal via at least two bands among the three bands,
wherein a value of Maximum Sensitivity Degradation (MSD) is applied to a reference sensitivity for receiving the downlink signal,
wherein the value of the MSD is pre-configured for a first combination of bands 1, n78 and n79, a second combination of band 3, n78 and n79, a third combination of bands 19, n78 and n79, a fourth combination of bands 21, n78 and n79.

4. The device of claim 3,
wherein the value of the MSD is 18.4 dB for band n79 based on the first combination of bands 1, n78 and n79,
wherein the value of the MSD is 4.6 dB for band n78 based on the first combination of bands 1, n78 and n79.

5. The device of claim 3,
wherein the value of the MSD is 16.3 dB for band n79 based on the second combination of bands 3, n78 and n79,
wherein the value of the MSD is 4.2 dB for band n78 based on the second combination of bands 3, n78 and n79.

6. The device of claim 3,
wherein the value of the MSD is 29.3 dB for band n79 based on the third combination of bands 19, n78 and n79,
wherein the value of the MSD is 28.8 dB for band n78 based on the third combination of bands 19, n78 and n79.

7. The device of claim 3,
wherein the value of the MSD is 30.1 dB for band n79 based on the fourth combination of bands 21, n78 and n79,
wherein the value of the MSD is 29.8 dB for band n78 based on the fourth combination of bands 21, n78 and n79.

8. The device of claim 3,
wherein for the first combination of bands 1, n78 and n79, the band 1 is used for the E-UTRA and the bands n78 and n79 are used for the NR,
wherein for the second combination of bands 3, n78 and n79, the band 3 is used for the E-UTRA and the bands n78 and n79 are used for the NR,
wherein for the third combination of bands 19, n78 and n79, the band 19 is used for the E-UTRA and the bands n78 and n79 are used for the NR,
wherein for the fourth combination of bands 21, n78 and n79, the band 21 is used for the E-UTRA and the bands n78 and n79 are used for the NR.

9. A method performed by a device configured with an Evolved Universal Terrestrial Radio Access (E-UTRA)-New Radio (NR) Dual Connectivity (EN-DC) in a wireless system, the method comprising:
receiving a downlink signal; and
transmitting an uplink signal via two bands which the EN-DC is configured to use,
wherein a value of Maximum Sensitivity Degradation (MSD) is applied to a reference sensitivity for receiving the downlink signal,
wherein the value of the MSD is pre-configured for a combination of bands 21 and n79,
wherein the value of the MSD is 18.4 dB for band 21 based on the combination of bands 21 and n79.

10. The method of claim 9,
wherein for the combination of bands 21 and n79, the band 21 is used for the E-UTRA and the band n79 is used for the NR.

\* \* \* \* \*